United States Patent
Grelewicz et al.

(10) Patent No.: US 7,953,847 B2
(45) Date of Patent: May 31, 2011

(54) MONITORING AND MANAGEMENT OF DISTRIBUTING INFORMATION SYSTEMS

(75) Inventors: Roland Grelewicz, Hampton (AU); Peter Farrugia, Camberwell (AU)

(73) Assignee: Remasys Pty Ltd, Melbourne, Victoria (AU)

( * ) Notice: Subject to any disclaimer, the term of this patent is extended or adjusted under 35 U.S.C. 154(b) by 693 days.

(21) Appl. No.: 11/706,031

(22) Filed: Feb. 13, 2007
(Under 37 CFR 1.47)

(65) Prior Publication Data
US 2008/0021994 A1    Jan. 24, 2008
US 2011/0078300 A9    Mar. 31, 2011

(51) Int. Cl.
G06F 15/173    (2006.01)
G06F 15/16    (2006.01)
G06F 17/00    (2006.01)
G06F 11/00    (2006.01)

(52) U.S. Cl. ............. 709/224; 709/227; 714/47; 706/50
(58) Field of Classification Search ........................ None
See application file for complete search history.

(56) References Cited

U.S. PATENT DOCUMENTS

| | | | |
|---|---|---|---|
| 5,602,991 | A | 2/1997 | Berteau |
| 2003/0065986 | A1* | 4/2003 | Fraenkel et al. ................ 714/47 |
| 2005/0027871 | A1* | 2/2005 | Bradley et al. ................ 709/227 |
| 2006/0059253 | A1* | 3/2006 | Goodman et al. ............ 709/223 |
| 2006/0161884 | A1* | 7/2006 | Lubrecht et al. .............. 717/104 |

FOREIGN PATENT DOCUMENTS
AU    18073/01    6/2001
JP    11-288382    10/1999
* cited by examiner

*Primary Examiner* — Wen-Tai Lin
(74) *Attorney, Agent, or Firm* — Banner & Witcoff, Ltd

(57) ABSTRACT

A method of managing a computing system (300) includes generating (1702) transaction requests in accordance with a transaction profile of the system (300). The transaction requests are provided for processing by the system (300). Status data of a set of managed resources (102) of the system (300) is collected (1704) in accordance with a system model stored in a knowledge base (204). Performance indicators of the system (300) are determined (1706) from the status data in accordance with the system model. The transaction performance of the system (300) is monitored (1710) by comparing the performance of the system (300) in processing the transaction requests with an expected performance. When a degradation in transaction performance is detected, a signal (1712) is generated to indicate that a degradation in performance has occurred, to enable the status data and/or performance indicators to be analysed at the time at which the performance degradation occurs. The method improves over prior art management methods by providing for the simultaneous measurement of the transaction performance of the system (300), along with monitoring of defined status and performance metrics, thereby enabling correlation between changes in performance and changes in the status of the system. A corresponding computer implemented means for managing a computer system, and computer program products, are also provided.

32 Claims, 16 Drawing Sheets

MONITORING AND MANAGEMENT OF DISTRIBUTING INFORMATION SYSTEMS

FIELD OF THE INVENTION

The present invention relates to the management of distributed computer systems, and in particular to a system and apparatus for monitoring and managing the performance of such systems.

BACKGROUND OF THE INVENTION

Distributed computer systems are widely used to deliver computing and information services to users who access the system over computer networks. The services provided by such systems include, for example, web services, remote terminal services, online shopping, electronic business services, online database access, and enterprise computing and intranet services, amongst many other possibilities.

The overall performance of any distributed computer system may depend upon the performance of a very large number of resources that are utilised by clients of the system in utilising the services that it provides. The resources that may influence overall system performance include not only the computing servers providing the main application services of the system, but also the shared network services, communications services, and access systems, such as network switches, routers, and data links that are essential for providing access to the main application services.

Accordingly, performance of distributed systems may be influenced by numerous factors, including traffic overload in parts of the interconnecting networks, the placement and interconnection of network resources, failures or degradation in the performance of various software and/or hardware components of the system, and the like. The performance issues become increasingly complex and difficult to understand and manage as the system and associated networks become larger and more complex. For example, if an element of the system is not responding to service requests, or is responding slowly, it may be difficult to determine whether the fault is in the element itself, in a data communication link, or in another element of the system, such as an intermediate network device, shared service or memory object that may be affecting the ability of the system element to receive and/or respond to requests.

Network and system management platforms, also referred to as management systems, are. intended to assist network and service operators in resolving such issues. Such network management platforms typically operate by collecting information from specified components of a distributed computing system, and making this information available for display and review by the system operator. For example, a management platform typically includes a graphical representation of the managed system. Alerts may be generated to inform the operator that an event has occurred that may require attention. In large systems, many such events may occur simultaneously, and accordingly most management platforms provide alert prioritisation and filtering.

Commercially available management platforms include SPECTRUM from Cabletron Systems, Inc, HP OpenView from Hewlett Packard Corporation, LattisNet, from Bay Networks, IBM Netview/6000 from IBM Corporation, and SunNet Manager from SunConnect.

While known management platforms are useful in enabling networks and information systems to be monitored, and sources of possible problems to be identified, there are nonetheless a number of problems associated with their installation and operation. In most cases, known management platforms are designed to collect and monitor a specific set of metrics associated with the managed devices and components of the system. It is often necessary to install additional components, or "agents" within the elements of the system to collect information about the resources associated with the element. Such platforms are typically based upon an object oriented architecture, that imposes a common object model upon all of the managed resources. This is done in order to provide a consistent interface between the managed elements and the management server and/or management applications that are used to monitor and control the managed resources.

Accordingly, traditional management platforms are limited to the collection and monitoring of a specific set of metrics of the managed resources, and constrained to managing the resources only of those elements within which suitable management agents have been installed. It is therefore not usually possible for the management system to adapt to changes to the architecture of distributed system or to monitor components outside the system under the control of a system operator without the installation of further management agents. This can be a significant limitation, since the system performance experienced by an end user may be affected by the performance of shared network services, such as Domain Name Services (DNS), that may be provided by servers that are located outside the control of the operator of a particular information service.

Furthermore, the interpretation of the metrics provided by traditional network management platforms requires expert knowledge of the systems and the metrics involved. Known management platforms do not provide performance metrics that are specific to particular information services, and that are intuitively meaningful to users or non-expert operators of information systems. In many cases, if an alert is generated by an event within the system, it may be difficult to relate the source of the alarm to any degradation in system performance that is experienced by end users. Conversely, end users may experience degradation in system performance, resulting in complaints, or calls to a help desk, that may not be readily associated with any specific change in the available metrics, or any alerts that may have been raised.

Accordingly, previous attempts to automate the prediction, detection and correction of causes of performance degradation have been largely unsuccessful, resulting in erroneous outcomes including false identification of problems where no degradation in user performance is experienced, and/or failures to identify causes of performance degradation that is experienced by end users.

Furthermore, when users do report faults or degradation in system performance, there may be a delay between the time at which the performance problems are experienced, and the time at which they are ultimately reported to a system manager. It may therefore be difficult to precisely pinpoint the time at which the performance problems occurred or commenced, and it may therefore be difficult to associate the performance problems with specific events, or changes in the metrics of the managed resources in the system. Accordingly, the correlation of events with changes in system performance is inherently subjective, and the identification of a root cause of such performance problems is also subjective, and therefore dependent upon the skill and expertise of the systems manager in interpreting the available information.

Accordingly, there remains a need for methods and apparatus for managing distributed computing systems that are able to mitigate at least one of the aforementioned problems experienced when using currently available management systems.

Any discussion of documents, devices, acts or knowledge in this specification is included to explain the context of the invention. It should not be taken as an admission that any of the material formed part of the prior art base or the common general knowledge in the relevant art on or before the priority date of this application.

SUMMARY OF THE INVENTION

In one aspect the present invention provides a method of managing a computing system, including the steps of:

generating transaction requests in accordance with a transaction profile of the system, said transaction requests being provided for processing by the system;

collecting status data of a set of managed resources of the system in accordance with a system model stored in a knowledge base;

determining performance indicators of the system from the status data in accordance with said system model;

monitoring transaction performance of the system by comparing the performance of the system in processing said transaction requests with an expected performance; and when a degradation in transaction performance is detected, generating a signal to indicate that a degradation in performance has occurred, to enable the status data and/or performance indicators to be analysed at the time at which said performance degradation occurs.

Accordingly, the present invention provides for the simultaneous measurement of the transaction performance of the system, along with monitoring of defined status and performance metrics, thereby enabling correlation between changes in performance and changes in the status of the system. Furthermore, the system model, and associated performance indicators, stored in the knowledge base may be specific to the system under management, and accordingly may define the most appropriate status data to be collected from the managed resources in order to monitor the status of the system, without imposing any generic object model or set of abstractions upon the managed resources. Additionally, the performance indicators may be adapted to the context of the system, so that they may be readily interpreted by non-experts as relating to particular aspects of system performance.

It will be appreciated that the status data of the set of managed resources may include various types of data maintained by the resources, and may include, for example, performance data relating to the resources.

The transaction requests may include requests to applications, shared services, communications services and/or access services. Application requests include, for example, Hypertext Transfer Protocol (HTTP) requests to web services, File Transfer Protocol (FTP) requests, Telnet requests to terminal services, Simple Mail Transfer Protocol (SMTP) requests to mail services and so on. Shared service requests include login requests and Domain Name Service (DNS) requests. Communications service requests include such operations as echo requests and traceroute requests. Access service requests include transactions at the data link layer, such as Address Resolution Protocol (ARP) transactions.

The transaction profile is preferably representative of actual operations performed by or on behalf of users of the system in accessing the information services provided by the system. Accordingly, the performance of the system in response to the generated transaction requests may reflect the actual performance experienced by end users.

It is therefore particularly preferred that the transaction requests are generated from user terminals, for example through Remote Procedure Call (RPC) mechanisms or the like. Accordingly, factors affecting the overall performance of the system in response to the generated requests include those that are local to the user terminals. This enables the invention, in at least preferred embodiments, to avoid, for example, false indications of possible system problems when, in fact, a degradation in performance may be specific to a particular user terminal. It is also therefore possible for such problems to be correctly identified and localised.

Preferably, the step of monitoring transaction performance of the system includes measuring the time taken by the system to process transaction requests. For the purposes of said comparison, expected performance of the system in processing a particular type of transaction request is preferably obtained by measuring the transaction performance of the system for a suitable period under normal operating conditions.

It is preferred that the knowledge base is a structured database embodying a model of the information system under management. Accordingly, expert knowledge of particular managed information system may be captured in the knowledge base, so that the information system may thereafter be managed by non-experts.

The knowledge base may define the managed resources of the system, which may include server and client computers, network elements, communications servers, applications and so on, and may also define the particular status data available from such resources that is relevant to monitoring and assessing the performance of the system.

The knowledge base may further include definitions of performance indicators derived from the status data. The performance indicators may be defined as arithmetic and/or Boolean functions of status data and/or other performance indicators.

In a particularly preferred embodiment, the knowledge base is hierarchically structured, having, for example, a tree structure, wherein the status data is represented at the lowest level of the hierarchy, and derived performance indicators are represented at higher levels, and with an increasing degree of abstraction. This capability of the knowledge base to provide free form abstraction of information allows users of the system to operate in terms that are familiar and meaningful to them, thereby reducing the time, effort and corresponding cost associated with traditional learning curves.

Accordingly, in preferred embodiments the method enables an operator to be provided with arbitrary subjective views of the system that are readily understood in relation to the user experience of system performance. No special expertise is therefore required to interpret the possibly esoteric status data provided by individual managed resources in order to assess how the system is performing.

Performance indicators may represent measures of technical performance of the system, such as responsiveness of the system to user requests. Alternatively, or additionally, performance indicators may represent measures of the performance of the system relative to business objectives, such as the performance relative to Service Level Agreements entered into with service providers.

The status data is preferably collected using any one or more of a number of suitable protocols, including but not limited to: Simple Network Management Protocol (SNMP); File Transfer Protocol (FTP); Open Database Connectivity (ODBC); Remote Procedure Call (RPC); Remote Shell (RSH); Secure Shell (SSH); Telnet; and/or CSV.

Accordingly, in preferred embodiments the method may be used to collect status data from a wide range of managed elements supporting various managed resources of the system without the need to install agents within the managed elements to provide a common interface and data abstraction.

Instead, all of the information required to collect the status data of interest, and to interpret that data, is contained within the knowledge base, which may also be used to specify the appropriate protocols to be used to collect the required status data.

Preferably, status data is collected at predetermined regular intervals, such that each item of status data has an associated resolution period that is equal to the collection interval.

Each performance indicator may also have its own associated resolution period that is appropriate to the nature of the particular performance indicator. For example, an accounting system having a monthly cycle of quiet and busy periods may have performance indicators with a one month resolution period. Accordingly, in preferred embodiments the method of the invention is able to account for cyclic variations in systems activity, so that predictable variations in status data, performance indicators and/or system performance will not be erroneously interpreted as being the result of system faults or other problems.

The resolution period of each performance indicator is preferably independent of the resolution periods of the status data. However, since performance indicators are in general abstractions of (that is, functions of) status data values, meaningful results will only be obtained if performance indicator resolution periods are greater than or equal to corresponding status data resolution periods.

When a performance indicator resolution period is a multiple of the status data resolution periods upon which it depends, there will be multiple status data values available within the performance indicator resolution period, and in this case the performance indicator may be calculated using a minimum, maximum or average of the status data values.

The performance of the information system is preferably monitored and assessed with reference to a nominal performance of the system. Accordingly, it is preferred that the method includes performing an initial baseline measurement of status data values and performance indicators over their respective resolution period, in order to determine nominal values of the status data and performance indicators.

It is further preferred that normalised values of status data and performance indicators subsequently be determined, being the present values of the status data and performance indicators relative to the nominal values determined by the baseline measurement. Accordingly, a preferred embodiment of the invention has the advantage that non-expert operators will be able to see whether the status data and/or performance indicators are within normal operating ranges or not. It is also thereby possible to avoid falsely associating a performance degradation of the system with a relatively high (or relatively low) status data value or performance indicator, if the value is in fact within normal operating ranges.

The step of generating a signal to indicate that a degradation in performance has occurred preferably includes generating an alarm or alert to an operator of the information system.

The method may further include the step of performing at least one action when a degradation in performance has occurred.

Preferably, performing an action includes conducting a Root Cause Analysis (RCA) in order to identify a cause of the degradation in system performance.

Preferably RCA includes differentiating the knowledge base against the baseline measurements, in order to determine the rate of change of the normalised status data values and performance indicators. It will be appreciated that status data values and performance indicators that have large or otherwise abnormal rates of change are likely to be indicative of the major factors contributing to degradation of system performance. Accordingly, in preferred embodiments the method includes reporting to an operator only those status data values and/or performance indicators that have large or abnormal rates of change. Advantageously, these constitute in most instances the root cause of performance degradation, and may be ranked in accordance with their relative importance.

The method may further include the step of monitoring the system to determine whether it is operating within a safe operating area, and generating a signal to indicate that a degradation in performance has occurred only when operation of the system is within said safe operating area. For example, parameters of the system corresponding to safe operation may be based upon a service level agreement established with a provider of resources and/or services to the system. Accordingly, if a degradation in performance of the system occurs that may be due to a degradation in performance of the resources or services provided under the service level agreement, and the system is operating within the corresponding safe operating area, a signal may be generated to indicate that a breach of the service level agreement has occurred. On the other hand, if the system is operating outside the safe operating area, then no breach of the service level agreement by the provider has occurred, and generation of a signal may be suppressed.

In another aspect, the invention provides a computer implemented means for managing a computer system including:

a knowledge base in which a model of the computer system is stored;

means for generating transaction requests in accordance with a transaction profile of the system, said transaction requests being provided for processing by the system;

means for collecting status data of a set of managed resources of the system in accordance with the system model;

means for determining performance indicators of the system from the status data in accordance with the system models;

means for monitoring the performance of the system by comparing the performance of the system in processing said transaction requests with expected performance; and means for, when a degradation in transaction performance is detected, generating a signal to indicate that a degradation in performance has occurred.

The means for generating transaction requests preferably includes suitable interface hardware for connecting to the computer system, and one or more software components executing on a central processing unit, including computer instruction code implementing one or more communication protocols for generating requests to applications, shared services, communication services and/or access services. The implemented protocols may include, but are not limited to, internet protocols such as TCP, UDP, HTTP, FTP, SMTP, DNS and/or ARP protocols.

In preferred embodiments, the means for generating transaction requests includes computer instruction code for implementing remote procedure calls or the like to direct managed elements within the system, for example user terminals, to generate transaction requests.

Preferably, the means for monitoring transaction performance includes suitable computer hardware and one or more software components executing on a central processing unit, including computer instruction code for measuring the time taken by the system to process transaction requests, and for comparing the measured time with expected times held within a memory store. The expected times may be obtained from measurements of transaction performance conducted over a suitable period under normal operating conditions of the system, the results of said measurements being stored within the memory store for later comparison with the results of subsequent measurements of transaction performance.

It is preferred that the means for determining performance indicators includes one or more software components executing in a central processing unit, including computer instruction code for computing the performance indicators in accordance with definitions stored in the knowledge base, the definitions preferably including arithmetic and/or Boolean functions of status data and/or other performance indicators.

The means for collecting status data preferably includes suitable interface hardware for connecting to the computer system, and one or more software components executing on a central processing unit, including computer instruction code implementing one or more communications protocols for communicating with managed resources of the system to retrieve status data therefrom. Implemented protocols may include, but are not limited to, SNMP, FTP, ODBC, RPC, RSH, SSH, Telnet and/or CSV.

The computer implemented means for managing a computer system preferably further includes a scheduler for scheduling the collection of status data by said collecting means at predetermined regular intervals. The scheduler may be implemented, for example, in the form of one or more software components executing on a central processing unit, including computer instruction code for periodically running collection jobs, the collection jobs including invoking or activating the means for collecting status data of the managed resources of the system.

The means for managing a computer system preferably further includes a memory store including stored values of the collected status data and calculated performance indicators. The means for determining performance indicators preferably includes computer instruction code implementing one or more periodically executing tasks, such as threads or processes, that recompute each of the performance indicators in accordance with an associated resolution period, and store the computed values within the memory store.

In a preferred embodiment, the computer implemented means for managing a computer system further includes means, such as one or more software components executing on a central processing unit, including computer instruction code for performing at least one action when a degradation in system performance has occurred. The action may include executing a root cause analysis engine, the root cause analysis engine preferably including one or more software components executing on a central processing unit, including computer instruction code for performing an analysis to identify a cause of the degradation in system performance.

Preferably, the root cause analysis engine differentiates the stored status data and/or performance indicators in accordance with the definitions in the knowledge base against stored baseline measurements representing a nominal performance of the system, and thereby identifying those status data and/or performance indicators that have large or abnormal rates of change.

In a particularly preferred embodiment, the means for managing a computer system includes computer instruction code implementing a web server to enable a user to access the management application using a web browser.

In yet another aspect, the invention provides a computer program product on a computer readable medium including executable instructions for implementing a method in accordance with the first described aspect of the invention.

BRIEF DESCRIPTION OF THE DRAWINGS

Further preferred features and advantages of the present invention will be apparent to those skilled in the art from the following description of a preferred embodiment of the invention. It will be understood, however, that the preferred embodiment is not limiting of the scope of the invention as defined in any of the preceding statements. The preferred embodiment is described with reference to the accompany drawings, in which.

DETAILED DESCRIPTION OF PREFERRED EMBODIMENT

Figure 1:
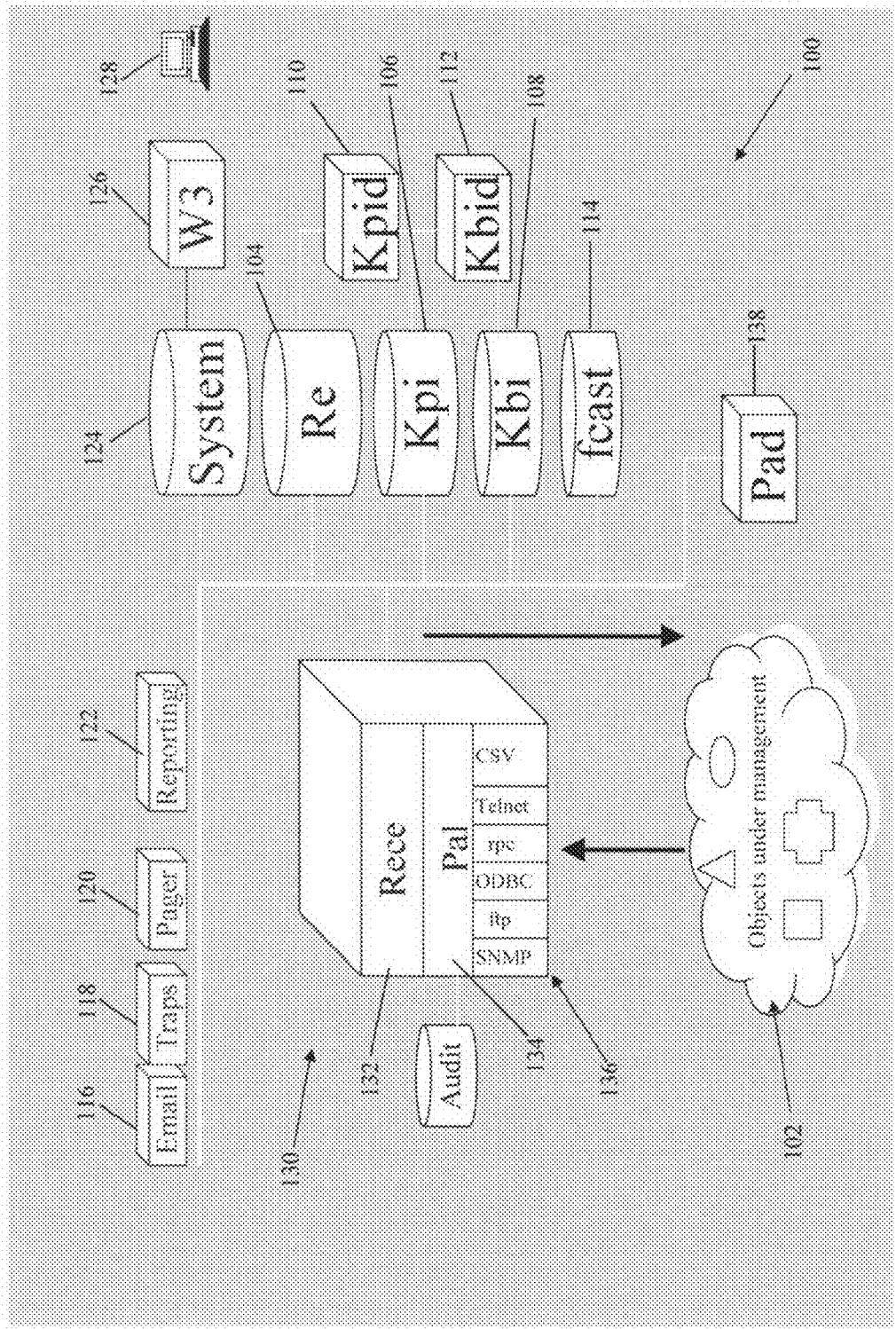
FIG. 1 is a schematic diagram of a systems architecture of a management system in accordance with a preferred embodiment of the invention.

FIG. 1 shows a schematic diagram of the architecture 100 of a management system according to a preferred embodiment of the invention. The management system is managing a distributed computer system, represented in FIG. 1 by a collection of objects under management 102. The objects under management 102 typically include applications, computing resources, network resources, and encompass the software and hardware resources making up the system under management.

It is one function of the management system 100 to collect management information relevant to the performance of the information system from the objects under management 102. This management information typically consists of various performance metrics and other status data maintained by the resources in the system. In the preferred embodiment, the status data available from the objects under management 102 is referred to as Raw Element (RE) information, and is collected and stored in a Raw Elements database 104.

While the Raw Elements represent the basic management information that is available from the objects under management 102, individual Raw Elements are generally not useful for interpreting and understanding the operation of a system under management. In known management systems, the available management information is generally reviewed and interpreted by expert operators, who are familiar with the systems under management and therefore have the requisite knowledge to identify and interpret the raw information that is most relevant to understanding the performance and identifying any problems in the system.

In the preferred embodiment 100, expert knowledge of the system under management is instead embodied in performance indicators that may be understood as abstractions of the raw management information available from the objects under management 102. Performance indicators are defined as functions of the Raw Elements, and these functions may take various forms, such as arithmetic, normalised and/or Boolean functions of the Raw Elements. Performance indicators may also be defined at increasing levels of abstraction, and may be functions of other performance indicators. In the preferred embodiment 100, a distinction is made between two types of performance indicator. The system provides for Key Performance Indicators (KPI) that generally represent aspects of the technical performance of an information system, such as the responsiveness of the system to user requests. Key Performance Indicators are stored in a KPI database 106.

The preferred embodiment also provides for performance indicators known as Key Business Indicators (KBI). Key Business Indicators generally represent measures of the performance of the system relative to business objectives, such as the performance of the information system relative to service level agreements established between a system operator and other service providers or users. Key Business Indicators are stored in a KBI database 108.

Since the KPIs and KBIs must be periodically calculated from the Raw Elements, dedicated processes 110, 112 are provided in the preferred embodiment to perform these periodic calculations and update the KPI and KBI databases 106, 108.

The preferred embodiment also provides a database of forecast information 114.

The forecast information includes forecasted values of any selected raw elements, KPIs and KBIs. A number of statistical seasonal forecasting algorithms are available for use by the forecasting process. The most appropriate algorithm may be selected based on past values and trends of the raw elements and/or raw performance indicators.

The management system 100 also includes processes for reporting information system performance to managers and operators of the system. For example, reporting processes may include process 116 for sending email reports to operators, process 118 for generating traps relating to events that occur in the system, process 120 for generating pager alerts and alarms, and process 112 for providing general reporting of the status and performance of the management system, as well as the system under management.

General information regarding the operation of the system is stored in system database 124.

The system database 124 defines the initial state of the system and maintains the system's operational state. Functions and information maintained by system database 124 include the job scheduler, job definitions, performance indicator (KPI and KBI) definitions, alert definitions, user definitions, system normalisation data, and definitions used by the proactive correction engine.

The preferred embodiment 100 also provides a web server process 126 that enables the system to be remotely accessed and operated using a web browser running on any desktop PC, eg 128.

From the foregoing general description, it will be appreciated that an important function of the management system 100 is the control and collection of management information from the objects under management 102. This functionality is provided by object management module 130 of the management system 100. The object management module 130 includes Raw Element Collection Engine (RECE) 132, Protocol Abstraction Layer (PAL) 134, and various protocol modules 136 that may be used to communicate with and gather information from the objects under management 102. Shown in FIG. 1 are protocol modules corresponding to SNMP, FTP, ODBC, RPC, Telnet and CSV protocols, however it will be appreciated by those of skill in this field of technology that various other known communications protocols may be provided.

Whereas many prior art management systems rely on agents installed within the various network elements of the information system under management in order to collect and provide management information, in the present invention no agents are required. Accordingly, the management system 100 may be deployed without the need to install additional software components or otherwise modify any of the objects under management. The provision of multiple protocol interfaces 136 and the protocol abstraction layer 134 provides the management system 100 with the ability to manage any type of object without reliance upon intrusive agents or limited and unreliable SNMP MIB information.

It will be appreciated that almost every network device or other element within an information system provides some type of management information relevant to its performance. It may, however, be necessary to employ various techniques to extract management information from different network elements. For example, some valuable information may be available via SNMP. In other cases, the most pertinent and valuable information relating to a particular network element may only be available by remotely logging onto the device and executing commands that return the desired information. In other cases, information may be available via Remote Procedure Calls (RPC) or through other protocols such as ODBC. Importantly, protocols such as RPC may also enable the management system 100 to direct various network elements, including end user terminals, to execute transactions with the information system that can be used to assess the present performance of the information system from an end user perspective.

Accordingly, in the preferred embodiment of the management system 100 an object oriented approach to modelling objects under management is not considered to be desirable. Object oriented methods generally involve the imposition of a common object model onto the objects under management, which necessarily imposes abstractions and generalizations upon the information available from those objects. Such abstractions may obscure important management information that each individual object is able to provide. Instead, according to the preferred embodiment of the management system 100, each type of object or element of the information system under management is treated separately, and is interrogated using whatever protocols are most effective in extracting the most useful and pertinent management information. It is the function of the PAL 134 in FIG. 1 to parse the information extracted in this way from the objects under management 102, in order to translate the management information into meaningful and storable data.

The Raw Element Collection Engine 132 coordinates the collection of management information from the objects under management 102. The RECE 132 incorporates a job scheduler that runs specified collection jobs at predetermined intervals. Accordingly, each RE has a corresponding resolution period, being the interval between executions of the job that is responsible for collecting the RE.

The management system 100 also includes a process 138 that is a proactive correction engine, that is able to detect possible faults in the system under management, and take corrective actions.

In the preferred embodiment, the proactive correction engine 138 is a table driven process wherein the table schema includes two fields, being a logical test and an associated action. The logical test is a Boolean expression which can be made up of any combination of raw elements, KPIs and/or KBIs. If at any time the logical test evaluates to a true value, the associated action is executed.

Figure 2:
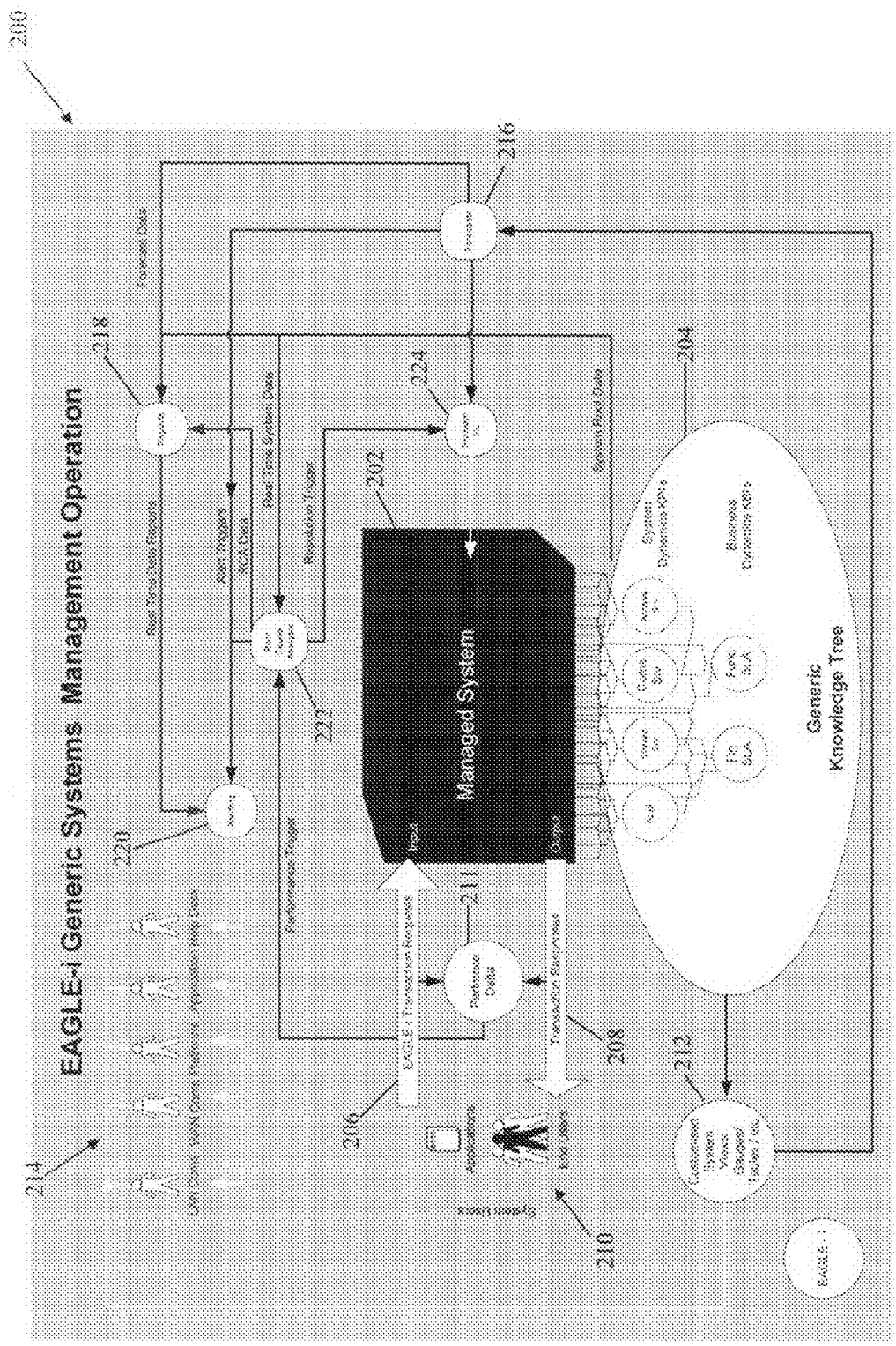
FIG. 2 is a schematic diagram of the systems management operation of a management system in accordance with a preferred embodiment of the invention.

Turning now to FIG. 2, there is shown a schematic diagram of the System Management Operation 200 of the preferred embodiment of the invention. The management system is configured to manage information system 202. The preferred embodiment of the invention includes a "knowledge tree" 204. The knowledge tree 204 is a knowledge base with a hierarchical conceptual structure that may embody a substantial amount of expert knowledge relating to the system under management 202. The knowledge embodied by the knowledge tree 204 includes knowledge of the types of network elements and other managed objects in the managed information system 202, the corresponding Raw Elements available therefrom, appropriate resolution periods for collection of Raw Elements, and various meaningful performance indicators including Key Performance Indicators and Key Business Indicators, that may be derived in relation to the managed information system 202.

Accordingly, the knowledge tree 204 may be understood to embody a management model of the managed information system 202, that may be configured using expert knowledge of the managed information system 202, and which may thereafter be used to manage the information system and provide relevant and meaningful information to assist non experts in the operations and maintenance of the information system 202.

The management operation of the preferred embodiment includes generating transaction requests 206 to the information system under management 202, and monitoring the performance of the system in providing corresponding transaction responses 208. The generation of transaction requests may be carried out under the control of the job scheduler in the RECE 132. As previously mentioned, it is preferred that transaction requests be generated from applications and end users 210 of the managed information system 202, to ensure that the transaction performance of the managed system 202 reflects the actual performance experienced by end users in relation to the profile of tasks usually required by end users. Accordingly, functionality such as remote procedure calls may be used by the management system 100 in order to generate transaction requests 206.

The corresponding performance of the managed information system 202 in response to transaction requests 206 may be determined from further management information collected from the objects under management by the RECE 132. Any changes in performance, represented by performance delta 211 in the management operation diagram 200, may thereby be detected. Accordingly, degradations in end user performance may be identified and used to trigger an analysis 222 of the root causes of such performance degradation. A particular advantage of the preferred embodiment of the management system 100 is that identification and analysis of problems in the managed information system 202 is triggered by actual degradation in end user performance. Therefore unnecessary analysis may be avoided, and detection of problems that may not be reflected in any degradation in performance of the information system 202 to end users may thereby also be avoided.

The preferred embodiment of the management system 100 is also able to provide customized system views 212 of the managed information system 202 to operators and managers 214 of the information system 202. The customized system views may include various graphical representations of system performance indicators, such as gauges, tables and the like. The particular view of the system that is most relevant will depend upon the particular function of the manager or operator 214. For example, the system view pertinent to an operator responsible for LAN communications is different from that which is pertinent to a help desk operator.

Particular views of the system may incorporate forecasts 216 of pre-detected system performance, which may be based on observed past performance of the system. The forecast data may be provided for the purposes of report generation 218, and for generating real time alerts 220 to potential problems in the managed information system 202. When problems do arise, the forecasts 216 and results of root cause analysis 222 may be used to identify a possible automated correction for the problem 224.

Figure 3:
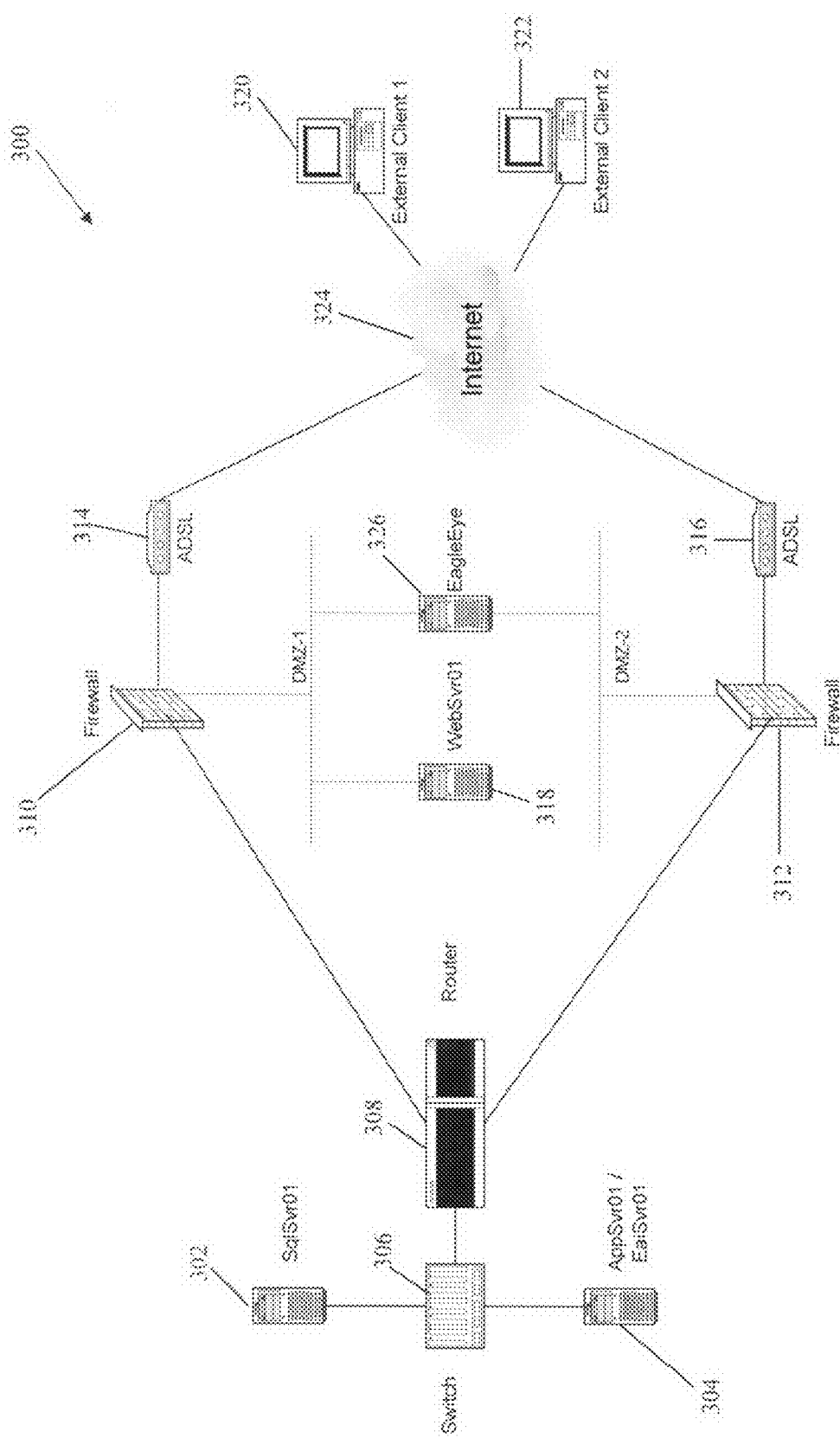
FIG. 3 shows schematically an example of an information system under management in accordance with a preferred embodiment of the invention.

FIG. 3 illustrates an example of an information system 300 under management in accordance with the preferred embodiment of the present invention. The exemplary information system 300 includes database server 302 and application server 304 connected via network switch 306 to internet router 308. These critical enterprise components are protected by firewalls 310, 312 and have redundant connections 314, 316 to the internet 324.

A web server 318 is provided outside firewalls 310, 312 in order to provide access to the information system by external clients, e.g. 320, 322, via the internet 324.

The management system executes on server 326.

A number of initial steps are carried out in order to bring the information system 300 under the management of the management system executing on server 326. Firstly, all of the physical elements constituting the information system 300 are documented, for example in terms of their network (eg internet protocol) addresses. That is, the management system is provided with relevant addresses for accessing each of the physical network elements, including the data base and application servers, switches, routers, fire walls, web server and modems, and possibly also external clients. Indeed, the "perimeter" of the information system 300 is arbitrary, and may be redefined at any time by modifying the documented list of physical elements.

The next step carried out by the management system is to perform a "discovery" process in relation to each of the physical elements. The purpose of the discovery process is to identify the protocols that are supported by each element, and to identify the Raw Elements, and appropriate means for extracting same, in relation to each managed object.

Next the number of clients of the information system 300, and their geographical distribution, is documented and provided to the management system. This information may be used to derive a meaningful statistical representation of the usage of the system, in order to assess the end performance of the information system from the user perspective. A suitable client transaction profile is then determined, which includes the set of transactions carried out by clients of the information system, and their relative frequency. This transaction profile is used by the management system to monitor end user performance of the information system.

It is then necessary to establish a suitable knowledge tree to be used by the management system. It will be appreciated from the foregoing discussion that the knowledge tree embodies all of the further information about the information system that is required for the management system to commence its monitoring and management functions. Certain types of well known information systems, such as the commercial systems PeopleSoft, JDE, Plumtree, Citrix and so forth, have various known properties, managed objects, and performance indicators. Accordingly, when the information system to be managed consists of such a known information system, a suitable knowledge tree may be selected or generated from a library of knowledge trees for known systems.

A knowledge tree selected from a knowledge tree library may be customized for local use by providing a colloquial name, or alias, that is specific to a particular information system. For example, a generic Plumtree knowledge tree may be internally referenced as the "xyz company portal".

If a suitable knowledge tree is not available, then the closest matching knowledge tree may be selected from the knowledge tree library. The selected knowledge tree may then be customized for the particular information system under management, by modifying the Raw Elements, KPIs and KBIs as required. Such customization may require the initial application of expert knowledge, however once a suitable knowledge tree has been developed the expertise is captured in the knowledge tree, and the ongoing requirement for expert analysis is thereafter significantly reduced. Accordingly, the knowledge tree may be understood as a repository of expert knowledge that enables the present invention, in at least the preferred embodiment, to reduce the dependence of operators of information systems on experts.

Next, the Raw Element collection engine is activated by assigning Raw Element collection jobs to nodes in the information system, or to suitable groupings of similar nodes. The transaction set may also require configuration to local requirements, for example it may be necessary to enter relevant user IDs and passwords for access to the various network elements in the information system. Once the Raw Element collection jobs have been specified, and any local configuration completed, the knowledge tree may be activated and the information system is brought under the management of the management system, with data collection being under the control of the scheduler of the RECE.

Once the knowledge tree is activated, the processes 110, 112 responsible for calculation and update of Key Performance Indicators and Key Business Indicators are also active. Each performance indictor may have its own associated resolution period that is appropriate to the nature of the particular performance indicator. For example, if the information system experiences load variations over a monthly cycle of quiet and busy periods, there may be corresponding performance indicators with a one month resolution period. It is preferable that the resolution period of performance indicators is independent of the collection intervals for the Raw Elements, however since the performance indicators will generally be functions of Raw Element values, meaningful results will only be obtained if performance indicator resolution periods are greater than or equal to the corresponding Raw Element collection intervals.

When the resolution period of a performance indicator is a multiple of the corresponding Raw Elements collection intervals, there will be multiple Raw Element values available within the performance indicator resolution period. In this case, the performance indicator may be calculated using a minimum, maximum or average of the Raw Element values over the performance indicator's resolution period, and the precise calculation performed will be defined by the definition of the performance indicator in the knowledge tree.

As previously mentioned, each performance indicator may take on at least one or more of an arithmetic value, a normalised value, or a Boolean value. An arithmetic value is obtained by evaluating an arithmetic expression over the resolution period of the performance indicator. The normalised value may be obtained by multiplying an arithmetic value by an appropriate normalisation factor. The purpose of normalising a performance indicator is to put the arithmetic values into an overall meaningful system context. The system context is obtained by determining the performance indicators corresponding to a "normal" operation of the system. This may be obtained by performing an initial baseline measurement of the Raw Elements and performance indicators over their respective resolution periods during normal operation of the system, in order to determine nominal expected values of the performance indicators under such typical conditions.

The normalised values of the performance indicators may therefore be extremely useful in assessing the ongoing performance of the system. While particular arithmetic values may be considered either high or low by comparison to some measure of capacity, they are not intrinsically meaningful in terms of their impact on performance of the system. Rather, it is deviations of the performance indicators from expected values over suitable resolution periods that may be indicative of causes of degradation of performance of the system. Observation of the normalised values of performance indicators is therefore preferable to observation of absolute values of the arithmetic expressions.

Boolean values may also be defined for performance indicators, which equates to the evaluation of a logical expression. The logical expression will, at any given time, have either a true or false result, and the Boolean expressions may therefore be used to indicate the status of a particular performance indicator. For example, the Boolean value may be used as a threshold trigger, whereby a change in state indicates a relevant variation in performance that represents a performance degradation which may require investigation. Boolean values may also be used to provide an indication of availability, and similar status indications.

Analysis of faults or problems in the information system under management is not, at least in preferred embodiments of the invention, conducted continuously. Many Raw Elements and/or performance indicators may fluctuate significantly during operation of the information system, however many such fluctuations will not correspond to faults or problems that result in any perceptible degradation in end user performance. Accordingly, to avoid the issuance of erroneous error or fault reports, fault analysis is preferably triggered only in response to actual user performance degradation.

Performance degradation may be identified through a change in state of a Boolean expression associated with a performance indicator. The performance indicator could be an indicator of the transaction performance of the information system, as established in response to transaction requests that may have been generated by actual end users, or be transactions generated under the control of the management system. Suitable triggers may be a slowdown in response times, or a failure of the information system to respond to transaction requests. In the event that a performance degradation is detected, the management system preferably conducts a root cause analysis, which in the preferred embodiment consists of differentiating the normalised knowledge tree against the baseline measurements representing "normal" performance of the system. The differentiation calculations result in a set of measurements of the rate of change of the normalised performance indicators. While it is expected that most performance indicators would exhibit some fluctuation over time, performance indicators that have abnormal rates of change may be reported by the system. It has been found that in most instances performance indicators with abnormal rates of changes are indicative of the root cause of performance degradation, and these may be ranked for review by an operator in accordance with their relative importance.

A desirable feature of the performance analysis conducted in accordance with preferred embodiments of the invention is that it is directly correlated in time with the trigger event of a measured performance degradation. Accordingly, the root cause analysis is carried out at the time that degradation in performance is first detected, ensuring that the changes observed in the performance indicators are those that are most relevant to the changes in overall performance. At least in preferred embodiments, therefore, the management system integrates a "horizontal" view of system performance with a "vertical" view of the status of the managed objects in the information system. The management system is therefore able to provide true automated event correlation, and automated root cause evaluation.

Figure 4:
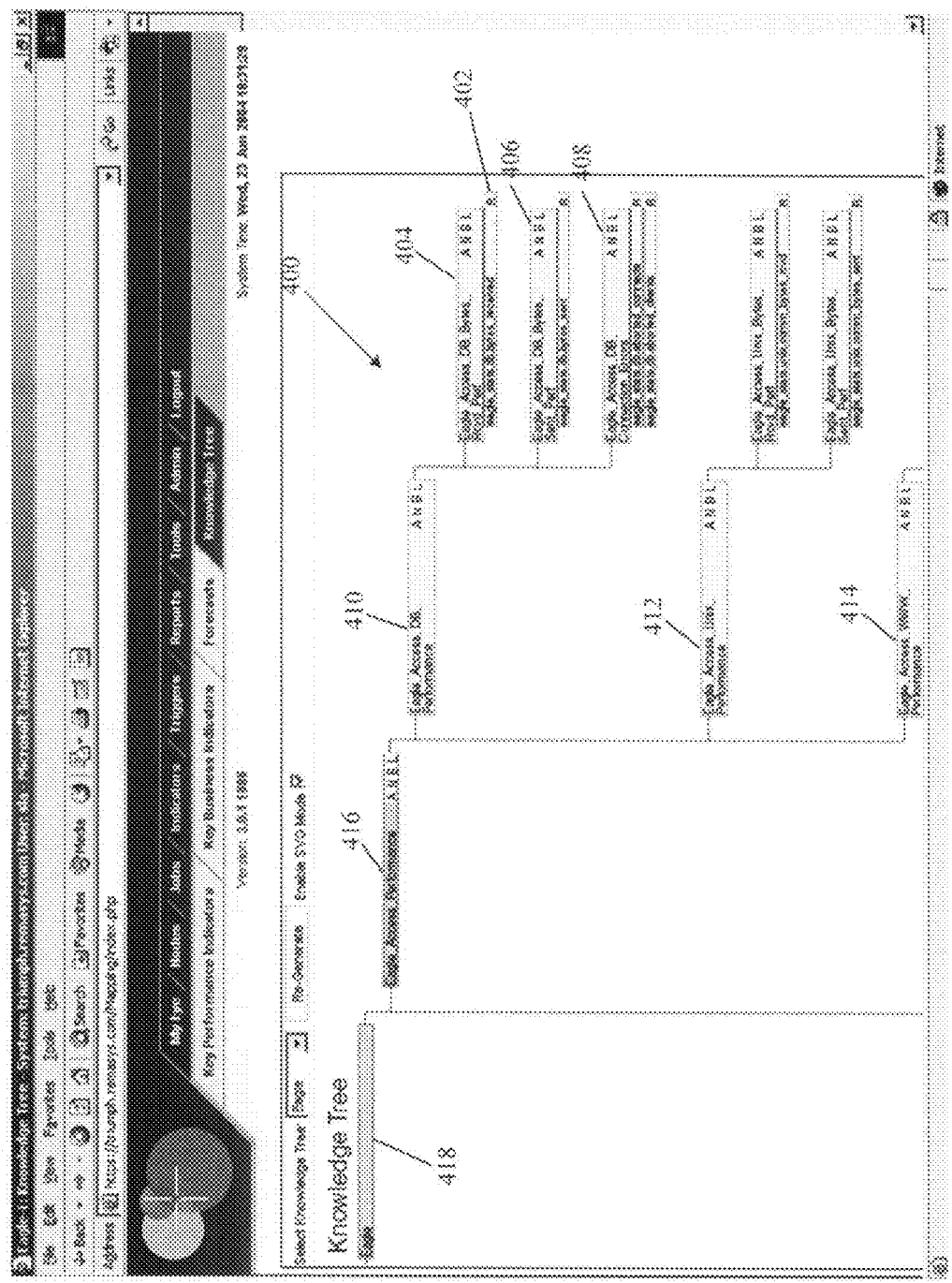
FIG. 4 is a screen display showing a knowledge tree representing a part of the computer system shown in FIG. 3.

Turning now to FIG. 4, there is shown a screen display of a knowledge tree representing a portion of the exemplary information system 300 shown in FIG. 3. At the lowest level of the knowledge tree are nodes, eg 402, representing Raw Elements collected from the managed objects of the system 300. At the next level are basic performance indicators, eg 404, 406, 408, derived from the corresponding Raw Elements.

At the next level of the knowledge tree, performance indicators, eg 410, 412, 414, are provided that give an overview of the performance of the system at a higher level of abstraction. These higher level performance indicators combine information from groups of lower level performance indicators, and corresponding Raw Elements, as indicated by the interconnections in the knowledge tree 400.

Figure 5:
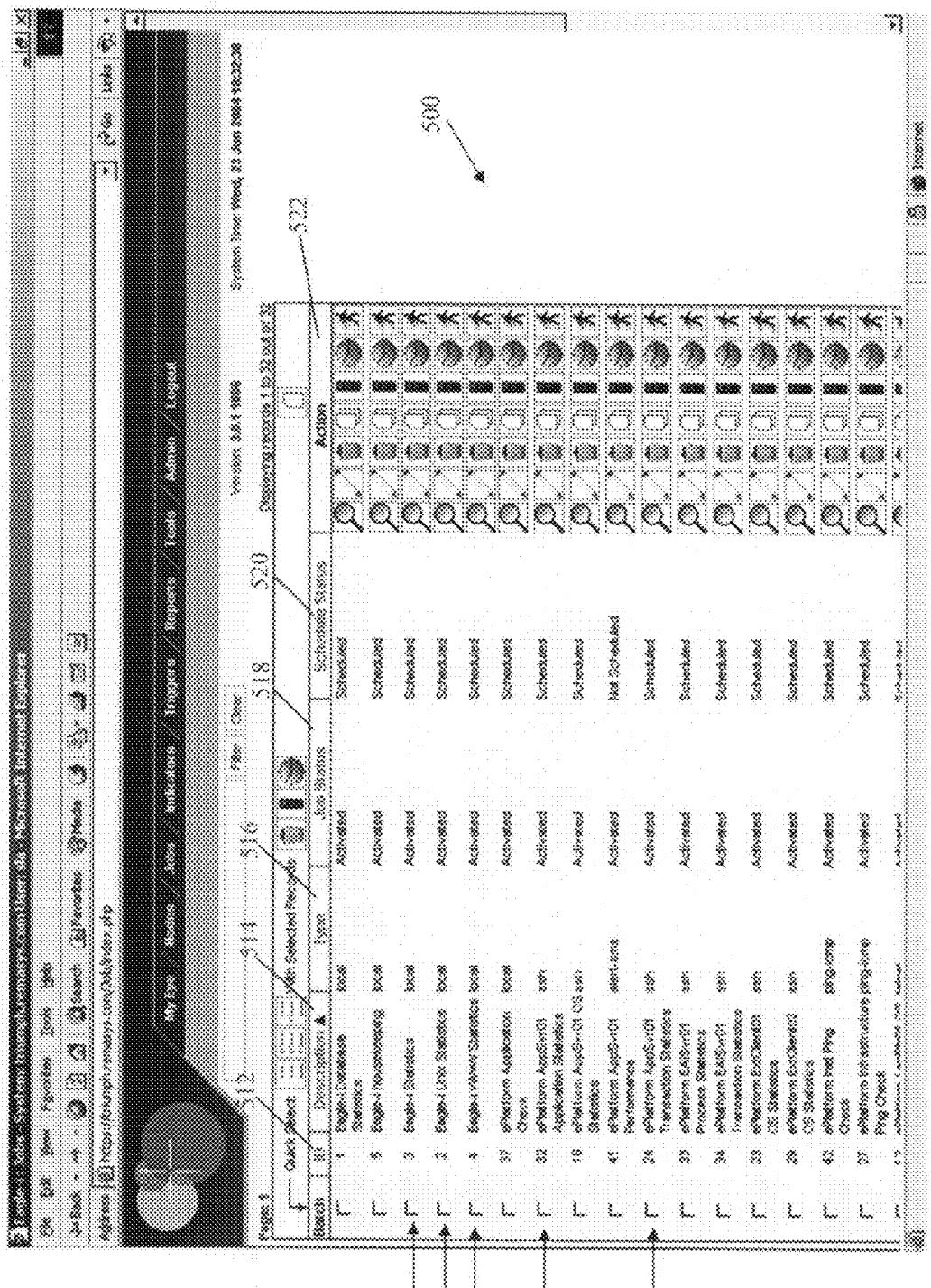
FIG. 5 is a screen display of a job scheduler listing for management of the computer system shown in FIG. 3.

Further performance indicators, eg 416, 418 are provided at increasing levels of abstraction. FIG. 5 details a screen display of a job scheduler listing for management of the exemplary information system shown in FIG. 3. The job scheduler listing 500 includes an entry for each Raw Element collection job that is being managed by the RECE job scheduler. For example, lines 502, 504, 506 correspond to collection jobs that are responsible for collecting the Raw Element management information upon which the performance indicators 410, 412, 414 shown in the knowledge tree 400 of FIG. 4 ultimately depend. Other Raw Element collection jobs, eg 508, 510, are responsible for collecting information, such as application statistics and transaction statistics respectively, from the application server 304.

As will be seen, the listing 500 includes various columns providing information about the collection jobs. ID column 512 lists a unique identification number for each collection job. A job description column 514 provides a meaningful name for the collection job. The type column 516 indicates the protocols used for collecting the Raw Element information. For example, "local" jobs are responsible for gathering information in relation to the management system itself. Other jobs use, for example, the SSH protocol to establish a remote connection to the managed system and collect the relevant information.

The job status column 518 indicates whether the job is currently activated or not, while the schedule status 520 indicates whether the job is running under the control of the RECE job scheduler.

Various action buttons 522 are provided to enable the operator to interact with the job scheduler to control the operation of the management system.

The job scheduler controls the frequency at which each job is repeatedly executed, which in turn sets the resolution of the corresponding Raw Elements and hence the minimum meaningful resolution of a KPI or KBI that is dependent upon the raw elements. At any time, the user may change the job frequency via the scheduler interface. The scheduler also has a "run once" and debug level facility whereby a job can be executed a single time upon demand by the user, for example for testing without impacting the integrity of the system, and in particular the Raw Elements database.

Figure 6:
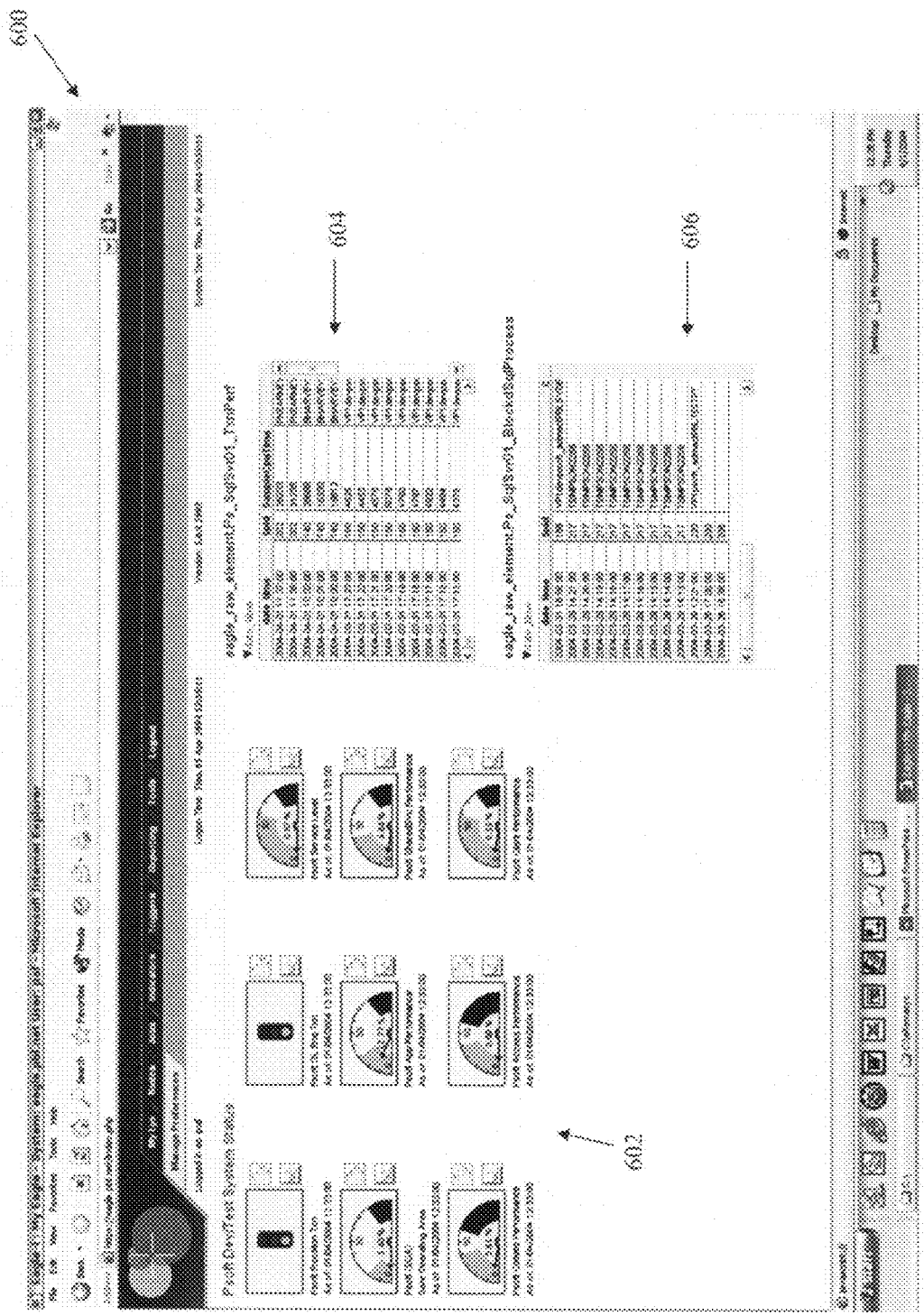
FIG. 6 is a screen display showing a status summary of a computer system under management in accordance with a preferred embodiment of the invention.

FIG. 6 shows a screen display 600 showing a status summary of an information system under management in accordance with a preferred embodiment of the invention. The screen display includes various indicators 602 that provide a graphical description of selected performance indicators. Tables 604, 606 provide listings of Raw Element information that have been collected, which in the status screen 600 are transaction performance and blocked process performance of a people soft SQL server respectively.

FIGS. 7 to 14 show screen displays illustrating a further specific example of the use of the preferred embodiment of the invention.

Figure 7:
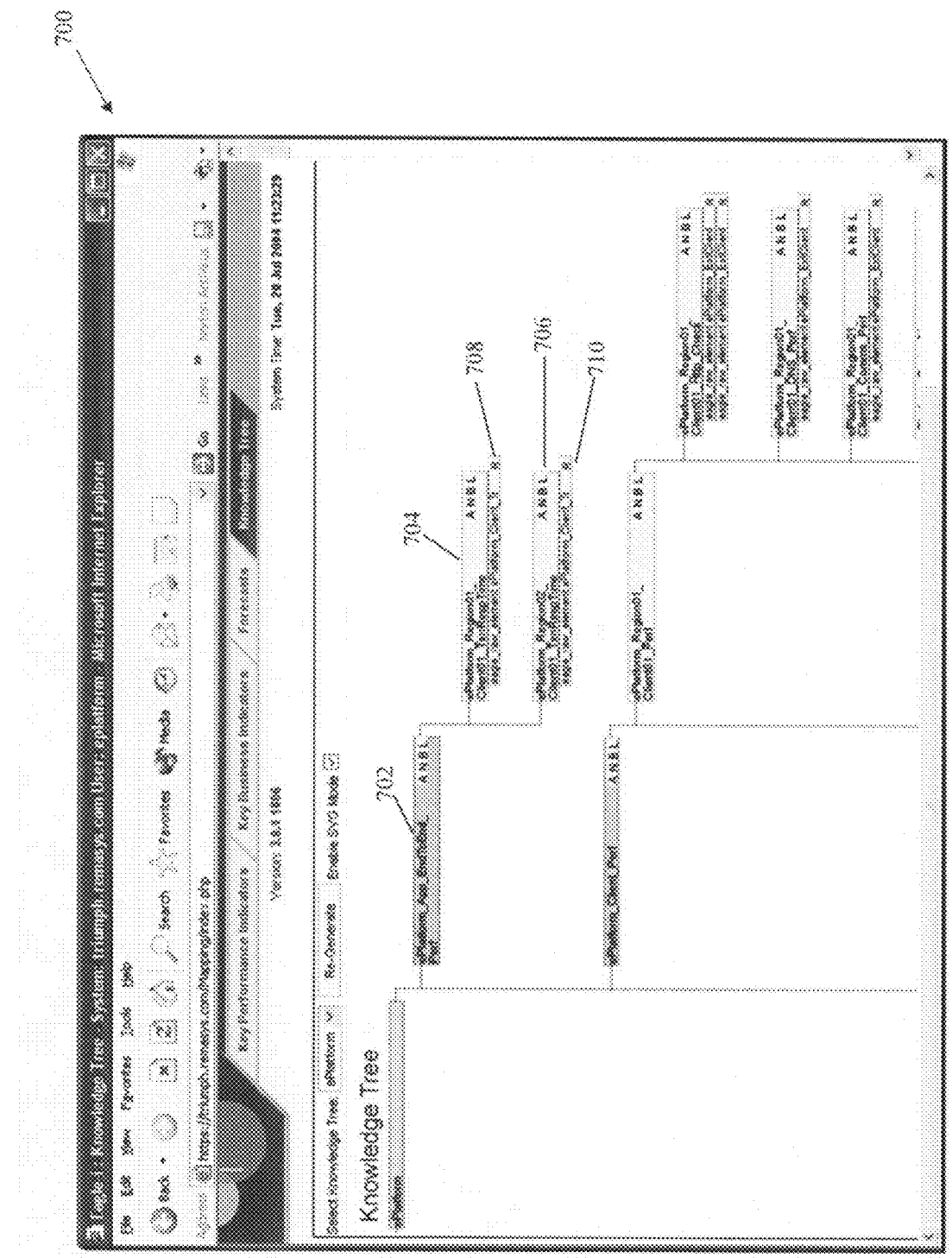
FIG. 7 is a screen display showing a further example of a knowledge tree for a system under management.

FIG. 7 shows a screen display 700 including a further example of a knowledge tree for a system under management. It will be appreciated that only a portion of the entire knowledge tree is shown. In particular, a node 702 of the knowledge tree is illustrated that represents a KPI embodying the end-to-end application performance of the system. This performance indicator is, in turn, dependent upon the KPIs represented as nodes 704, 706 of the knowledge tree, each of which represents the transaction response time experienced by a particular client terminal of the system. These transaction response time KPIs are themselves dependent upon Raw Elements 708, 710.

Figure 8:
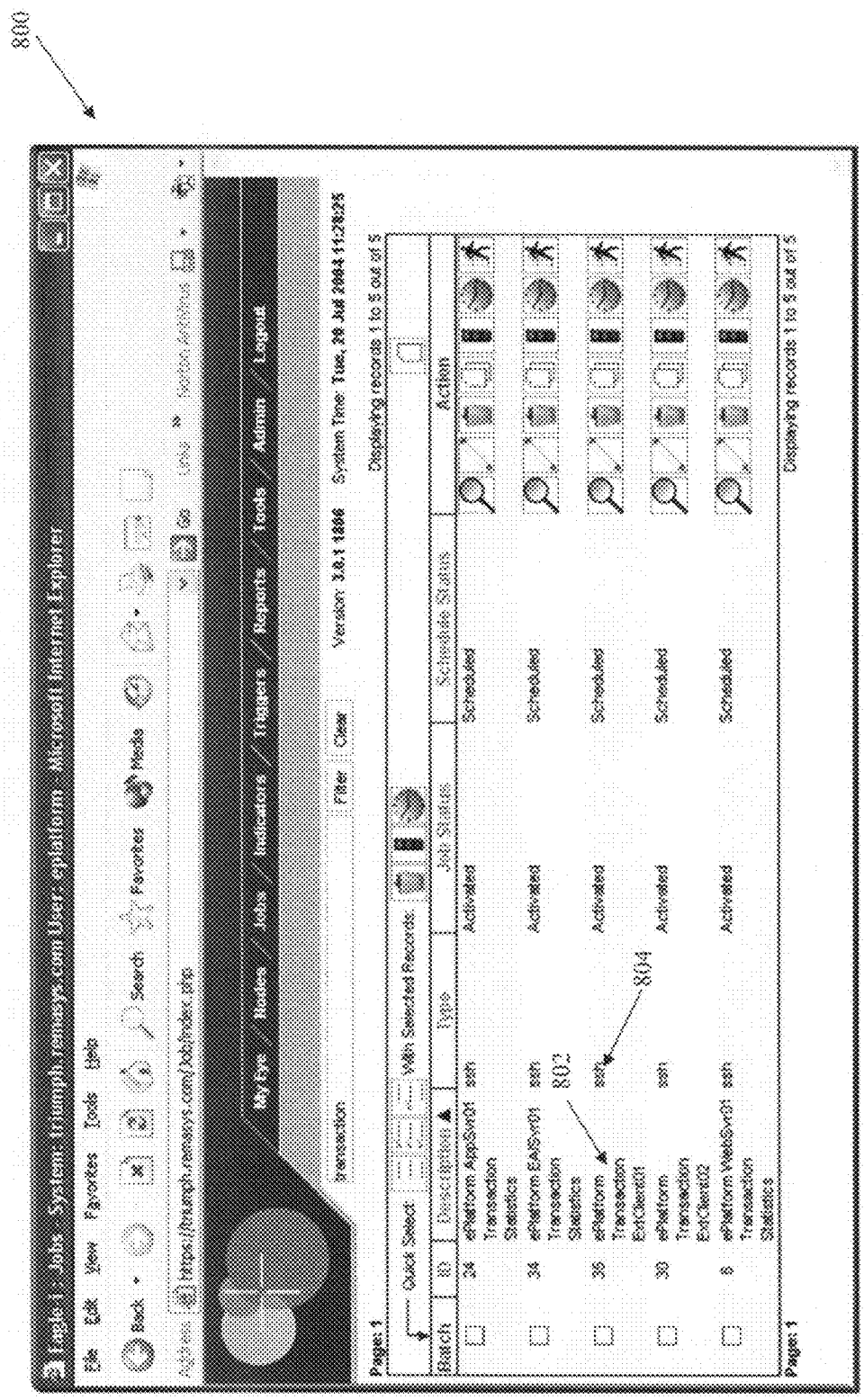
FIG. 8 is a screen display of a job scheduler listing corresponding to the knowledge tree of FIG. 7.

FIG. 8 shows a screen display 800 of the job scheduler listing corresponding to the knowledge tree of FIG. 7. In particular, for the purposes of the present example, the scheduler listing includes a job 802 corresponding to the measurement of the transaction performance experienced by a particular client of the system. As indicated by the type 804, the job 802 collects Raw Elements using the secure shell (SSH) protocol to access the client terminal.

Figure 9:
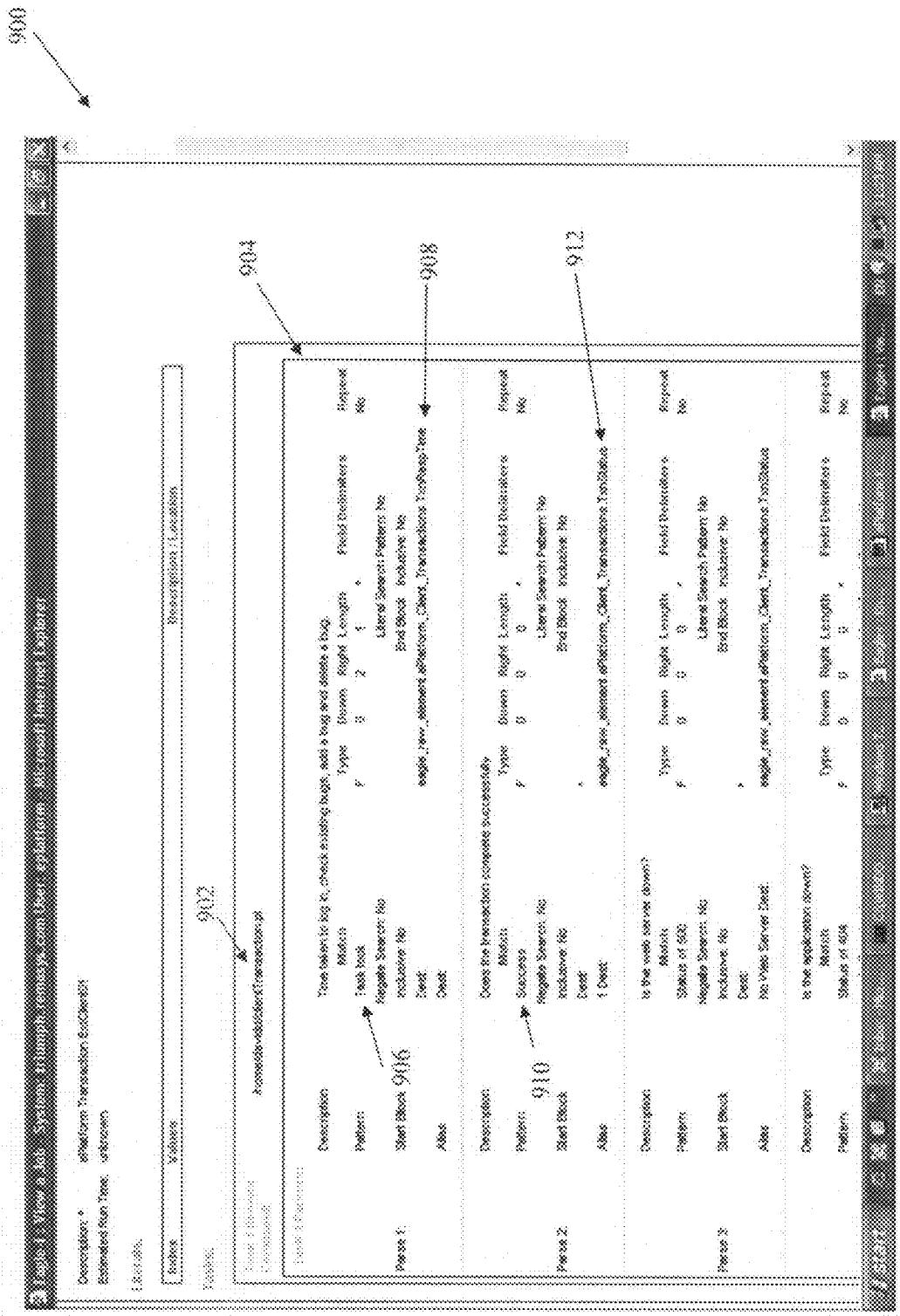
FIG. 9 is a screen display showing a job definition corresponding to one of the scheduled jobs listed in FIG. 8.

Details of the job 802 are shown in the screen display 900 illustrated in FIG. 9. As can be seen in the display, the job includes a task that is carried out by executing a remote command 902 using the SSH protocol. The remote command is a script that executes on the client terminal, and which produces output that may be parsed as part of the job execution. The manner in which the output is parsed is defined by the task parsers shown within the box 904.

For example, a first parsing function includes identifying a specified pattern 906, being the specific phrase "task took", within the output from the remote command. The output following this phrase, being the actual time taken to perform a transaction, is captured by the parser and stored within a defined and identifiable location specified by the destination 908.

A second parsing function includes identifying a further pattern 910, being the word "success", the presence of which indicates that the transaction completed successfully. A Boolean value, representing the success or failure of the transaction to complete in accordance with the presence or absence of the word "success", is stored in the identified destination 912.

It will be appreciated that further parsing functions may be defined, and some further parsing functions are in fact visible in. FIG. 9. It should also be understood that a particular job may include a number of tasks, and not just a single task as is visible in the display 900 of FIG. 9.

Figure 10:
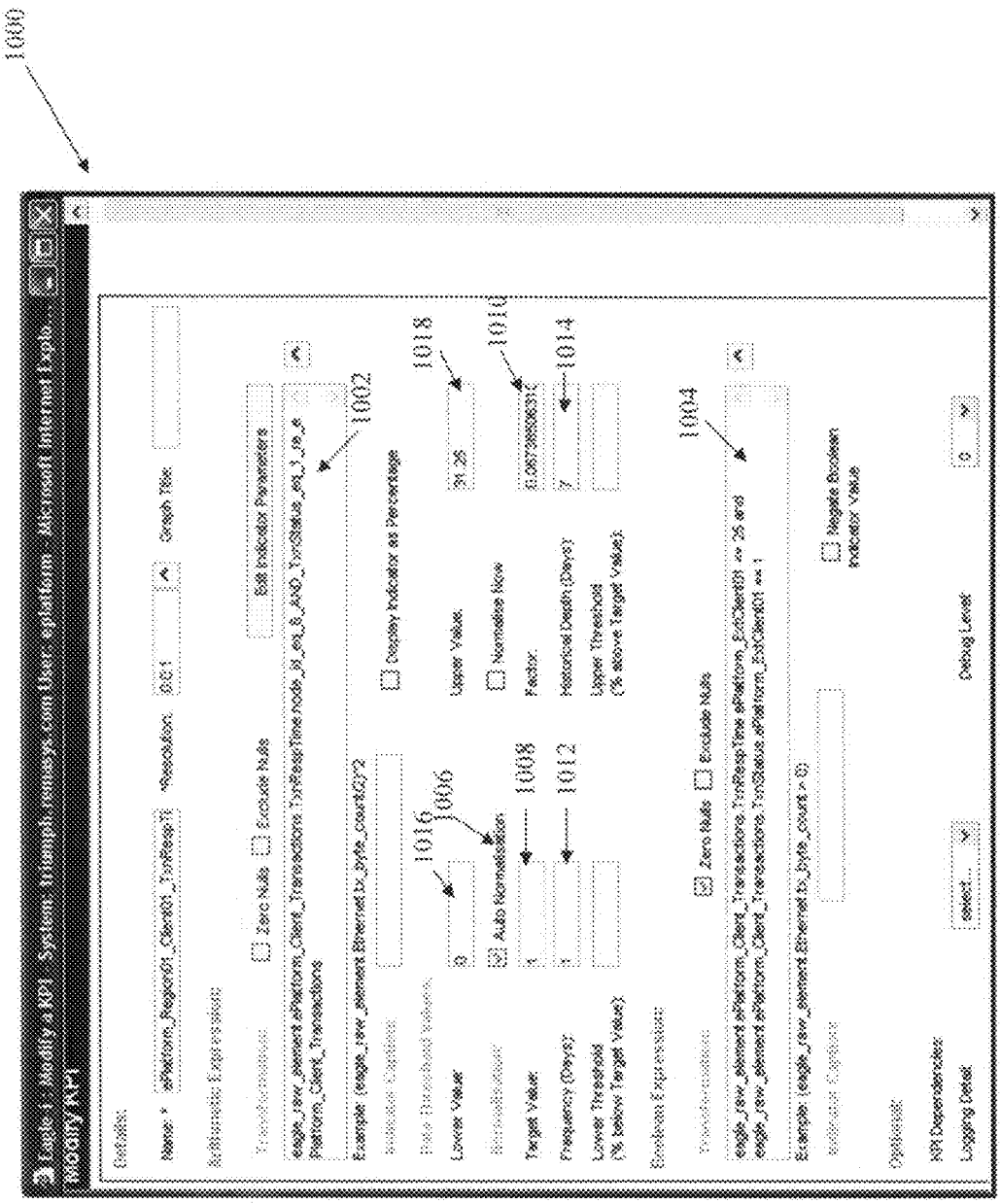
FIG. 10 is a screen display for viewing and/or modifying a key performance indicator of the knowledge tree shown in FIG. 7.

As has been described, Raw Elements form the basis for defined performance indicators, including KPIs and KBIs. FIG. 10 shows a screen display 1000 that enables the user to define a KPI, for example based upon the Raw Elements collected by job 802 and stored in the defined destination locations, eg 908, 912. The example shown in FIG. 10 illustrates the definition of the first client transaction response time represented by node 704 in the knowledge tree illustrated in FIG. 7.

The entry box 1002 in display 1000 allows the user to enter an arithmetic expression defining an arithmetic value of the performance indicator. In the example shown, the expression corresponds to a measured transaction response time for the transactions generated and measured by the job 802.

Additionally, a Boolean expression may also be defined and associated with the same performance indicator. The user is able to enter the desired Boolean expression within the entry box 1004. In the example shown in FIG. 10, the defined expression will be true whenever the transaction attempts generated by job 802 are successful, and the corresponding transaction response time is less than 25. Accordingly, the expression 1004 may be understood as being true whenever the computer system is operating normally, and successfully responding to transaction requests with less than the specified response time. It is therefore an indication, when true, that the system is satisfying a particular service level requirement.

As further illustrated in the display 1000, the user is also able to specify the manner in which the arithmetic values of the performance indicator should be normalised. In the illustrated example, the user has selected auto normalisation 1006. The target value following normalisation is specified in entry box 1008, and has been set to one. Following auto normalisation, the corresponding multiplying factor required to scale the arithmetic values of the expression to corresponding normalised values is shown in text box 1010, the contents of this text box being the current normalisation factor. The user is also able to specify the frequency 1012 with which normalisation is performed, and the historical depth 1014 of the data retained for normalisation.

Additionally, the user is able to specify lower and upper threshold values 1016, 1018 which may be used, for example, to trigger alarms or other actions when the arithmetic value of the performance indicator falls outside the corresponding defined range.

Figure 11:
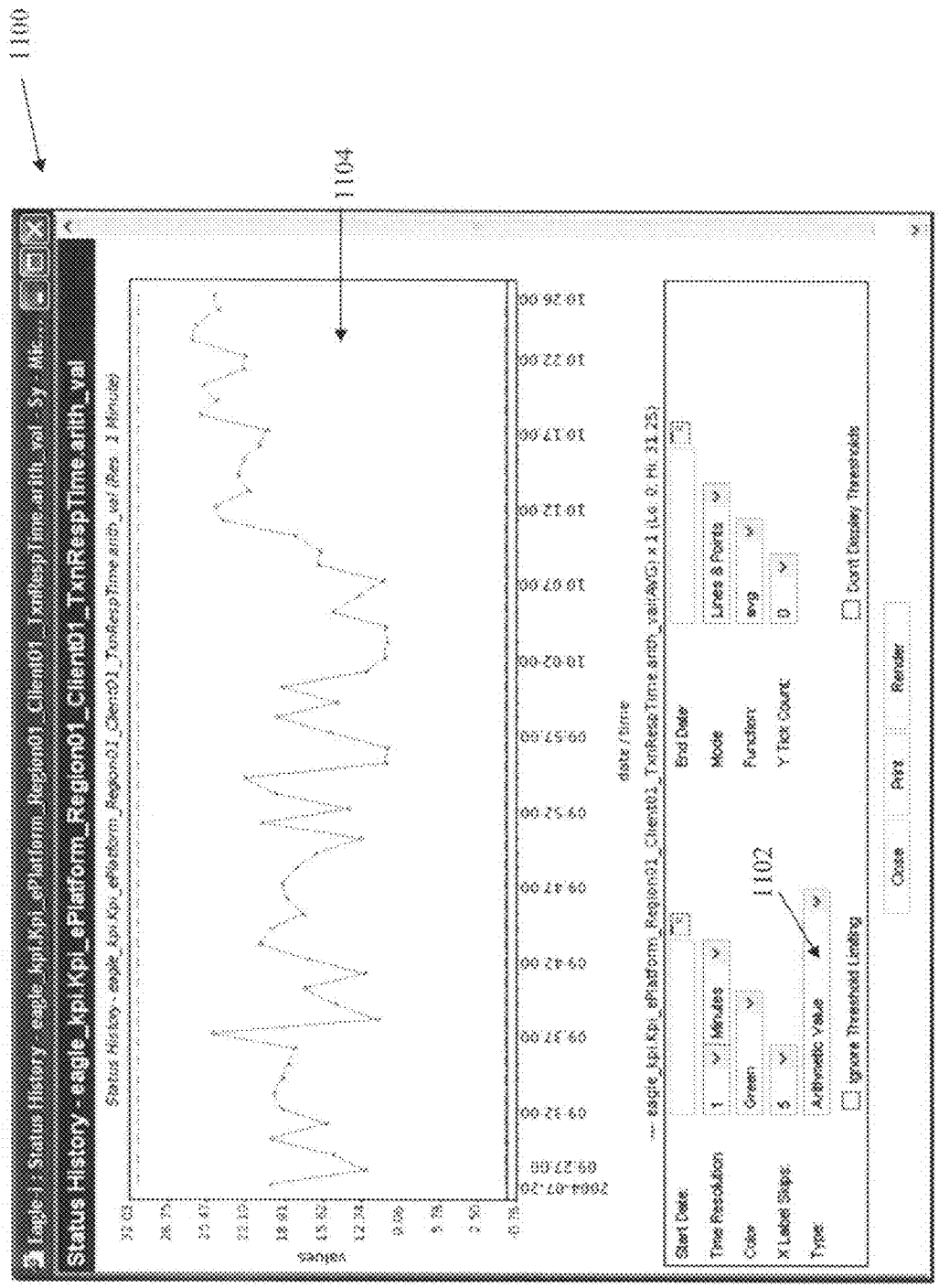
FIG. 11 is a screen display showing a chart of arithmetic values of a performance indicator of the system represented by the knowledge tree of FIG. 7.

A user of the system is also able to display charts of the historical values of any performance indicator. FIG. 11 shows a display 1100 of values of the performance indicator as defined in the display of FIG. 10 over a period of one hour. In the display 1100, the user has elected to show arithmetic values by choosing this type from the dropdown selection list 1102. The values are shown as a graph 1104 of the performance indicator over the one hour period. As can be seen, for the majority of the period the arithmetic values of the performance indicator, being the transaction response time, fluctuate about a value of approximately 15. Towards the end of the depicted period, it appears that the response time may be increasing. However, while this display provides a good indication of the absolute response times of the system to a client transaction request, it is not easy to tell whether the apparent increase in response times is within the expected operating range of the system, or alternatively may be indicative of a degradation in performance.

Figure 12:
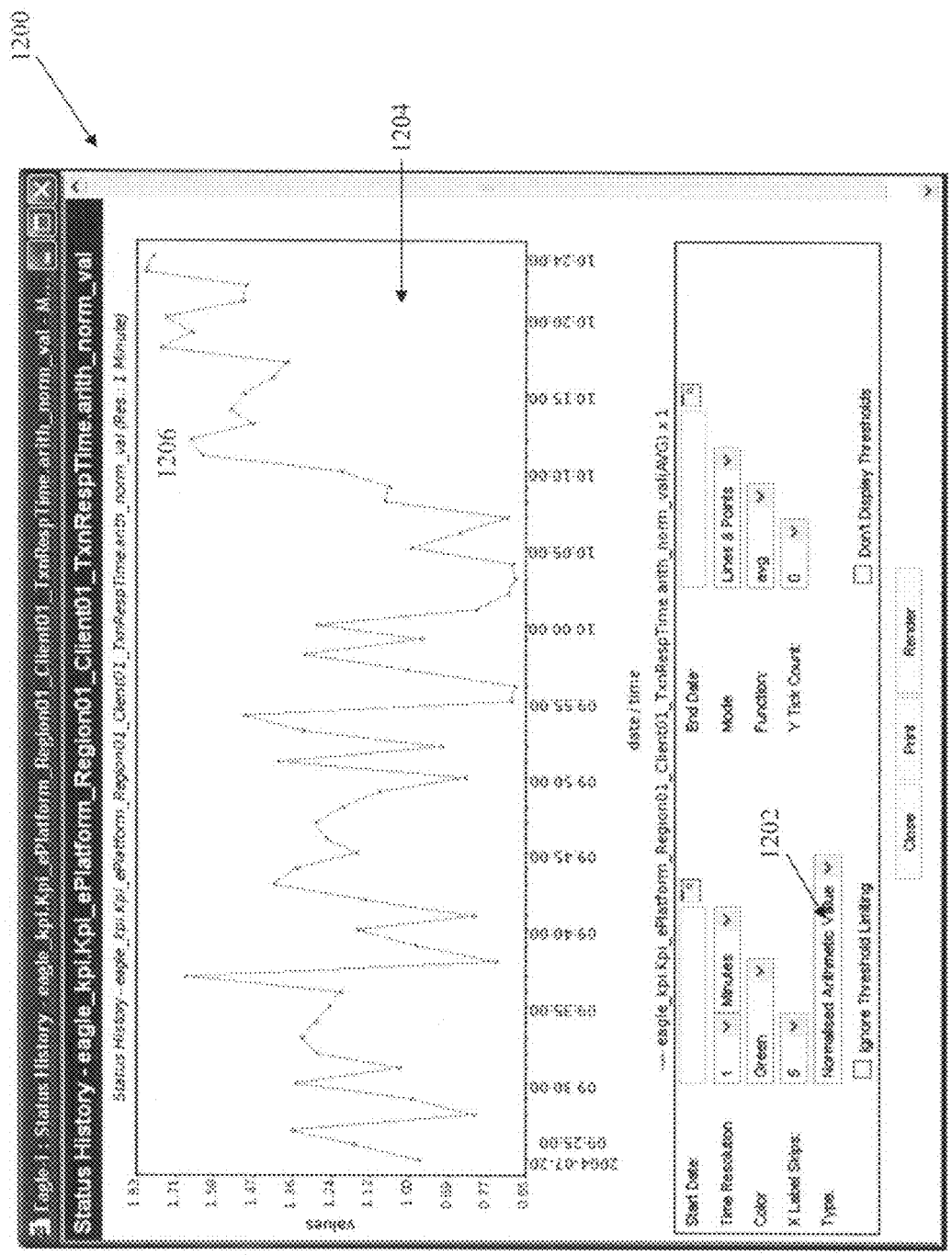
FIG. 12 is a screen display showing a chart of normalised values of a performance indicator of the system corresponding to the arithmetic values of FIG. I 1.

Accordingly, as illustrated in the display 1200 of FIG. 12, the user is able to select the type "normalised arithmetic value" from the dropdown list 1202, in order to produce a corresponding graph 1204 of normalised values of the performance indicator. As can be seen, during the initial portion of the period shown in the graph 1204, which corresponds to the graph of arithmetic values 1104, the response time performance indicator is fluctuating around a normalised value of one, which is the target and hence nominal, expected, value of the performance indicator. It is therefore more apparent that the increased response times, and in particular the peaks 1206, may represent an abnormal departure from the typical expected operation of the system.

Figure 13:
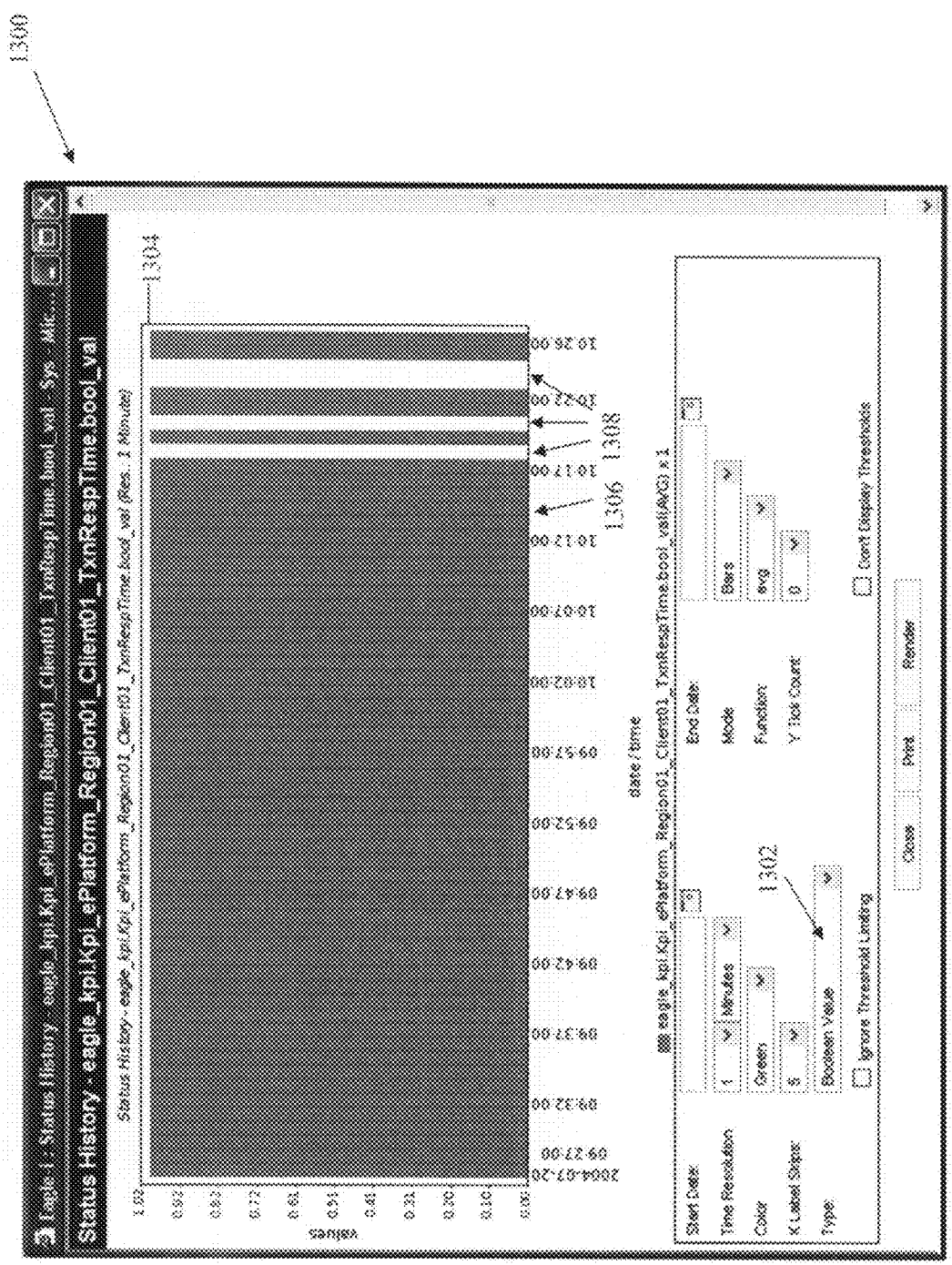
FIG. 13 is a screen display showing a chart of Boolean values of a performance indicator of the system represented by the knowledge tree of FIG. 7, illustrating service level compliance of the system.

By switching the type of the performance indicator to "Boolean value" the display 1300 shown in FIG. 13 is obtained. As can be seen, the type has been set using the dropdown list 1302. The Boolean expression for the performance indicator was set in text entry box 1004, as illustrated in the display 1000 of FIG. 10. Accordingly, during normal and acceptable operation of the system, the graph 1304 shows the expression to have evaluated to true, as indicated by the presence of a bar, eg 1306, of unit height in the chart 1304. However, there are periods during which excessively slow response times are experienced, corresponding to the peaks 1206 in FIG. 12, and these times are clearly visible by the absence of bars in the chart at points 1308.

Accordingly, the display 1300 including bar chart 1304 allows the user to very rapidly determine whether the system is currently satisfying a specified service level. One application of this facility is to embody parameters of a service level agreement with a third party provider of services or resources to the system in the form of a suitable performance indicator, such as a KPI or KBI. A failure at any time of the system to satisfy the agreed service levels may indicate a breach of the service level agreement. However, it is also possible that the system may be operating outside of other parameters agreed with the service provider, and accordingly before asserting that a breach of the agreement has occurred it must be established that the system is operating overall within a safe operating area satisfying all requirements of the agreement. Accordingly, further performance indicators may be defined that embody a definition of the safe operating area of the system, and an alert indicating that a service level agreement has been breached is then only generated when an agreed service level indicator falls outside the defined range while the system is operating within the safe operating area. If both of these conditions are not simultaneously satisfied, then no breach of the service level agreement has occurred. It will therefore be appreciated that, in at least preferred embodiments, the present invention provides an extremely useful tool for defining, implementing, monitoring, and maintaining service level agreements with service providers.

Figures 14, 15:
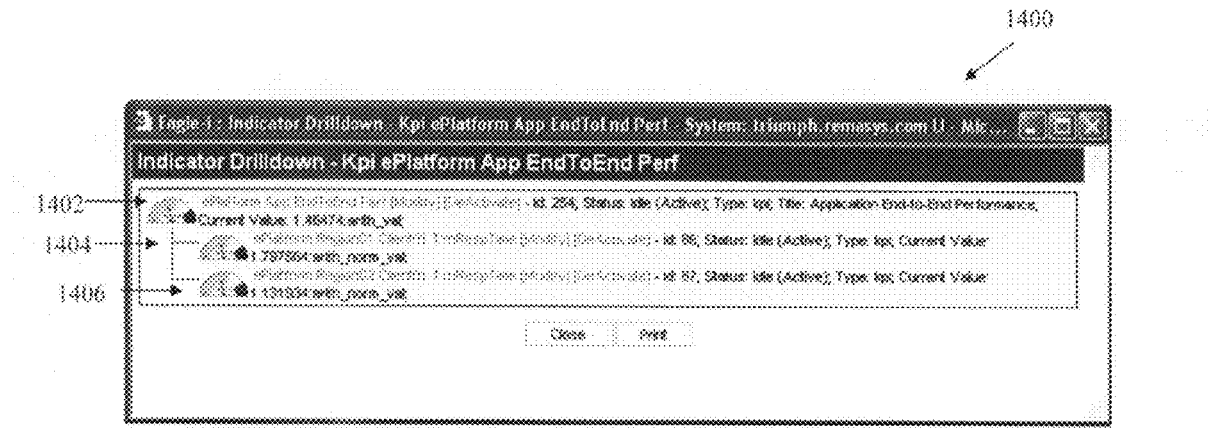
FIG. 14 is a screen display showing indicator drill down for a performance indicator of the system represented by the knowledge tree of FIG. 7.
FIG. 15 is a screen display showing a status summary of the system represented by the knowledge tree of FIG. 7.

FIG. 14 illustrates a display 1400 showing an indicator drill down for the end-to-end application performance indicator represented by node 702 in the knowledge tree illustrated in FIG. 7. The drill down display may be called up by the user from the knowledge tree, and provides a useful tool for examining the current status and performance of the system. The drill down display shows current status information and values of the corresponding performance indicators. For example, in the display 1400 there is shown the application end-to-end performance indicator 1402, above the two client transaction response time performance indicators 1404, 1406 upon which it depends. This provides the user with an overview of the current state of the system represented by the corresponding portion of the knowledge tree.

FIG. 15 illustrates a further display 1500 of a status summary of the system represented by the knowledge tree shown in FIG. 7. The user is able to define the performance indicators whose values are shown on the status display 1500, and for example the current Boolean value and normalised value of the end-to-end application performance indicator is shown by status icons 1502, 1504.

Figure 16:
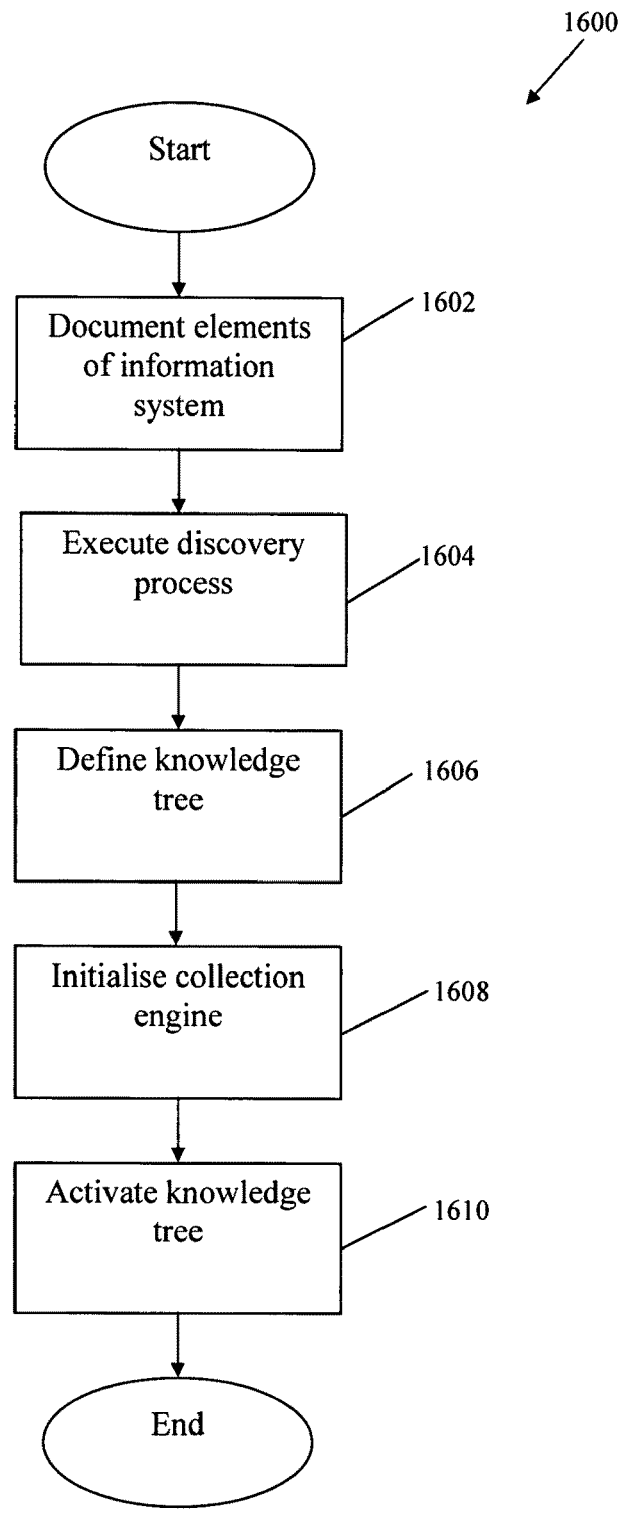
FIG. 16 is a flowchart illustrating the main steps carried out in initialising and activating a management system in accordance with a preferred embodiment of the invention.
Figure 17:
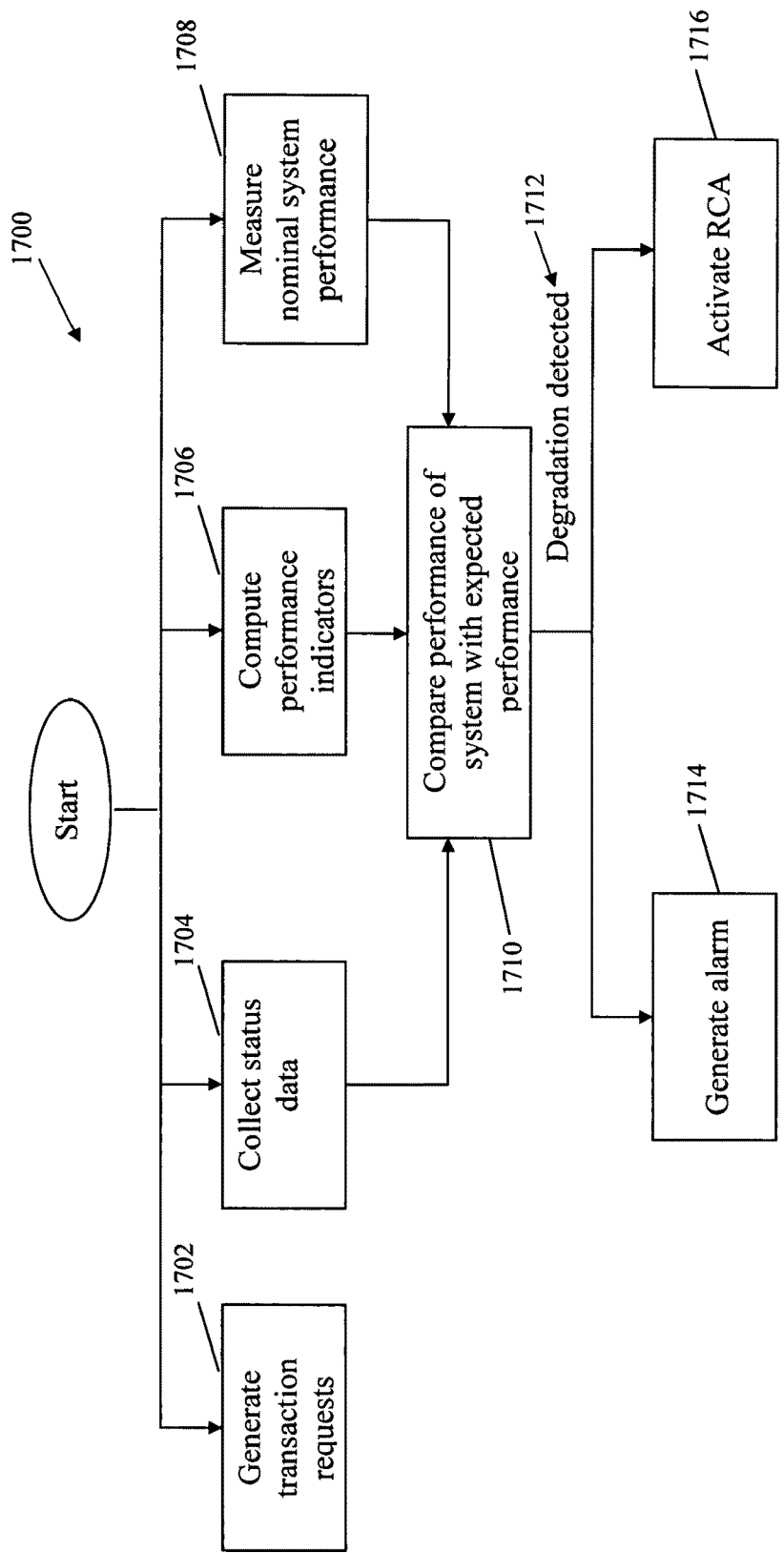
FIG. 17 is a chart illustrating schematically the main steps and processes carried out during normal operation of a management system according to a preferred embodiment of the invention.

FIGS. 16 and 17 summarise the main steps and processes carried out in initialising and operating a preferred embodiment of a management system, as previously described with reference to FIGS. 1 to 15. More particularly, FIG. 16 shows a flowchart 1600 illustrating the main steps carried out in initialising and activating the management system. FIG. 17 shows a chart 1700 that illustrates schematically the major steps and processes carried out during normal operation of the system.

As shown in the flowchart 1600 of FIG. 16, and as has been previously described with particular reference to FIGS. 2 and 3, initialisation and activation of a preferred embodiment of the management system may generally be summarised by the following steps. Firstly, at step 1602, the elements of the information system are documented, and the discovery process is then carried out, at step 1604, in order to identify the protocols supported by each element of the information system under management, to identify the Raw Elements, along with appropriate means for extracting these Raw Elements. At step 1606 a suitable knowledge tree is established, for example by utilising or adapting a previously determined knowledge tree stored in a knowledge tree library. At step 1608, the collection engine is initialised, and at step 1610 the knowledge tree is activated, bringing the information system under the management of the management system.

The flowchart 1700 shown in FIG. 17 illustrates schematically the normal steps and processes carried out by the management system once the knowledge tree has been activated. As will be appreciated from the foregoing discussion, during normal operation the management system carries out various operations, effectively in parallel, many of which are initiated under the control of the job scheduler. It will therefore be understood that the chart 1700 is schematic in nature, and that the steps and processes illustrated therein are not necessarily carried out in a particular sequential order. However, the chart 1700 generally illustrates the dependency of each major step or process executed by the management system on output generated by other steps or processes which have been previously executed.

Once activated, the management system generates transaction requests 1702 in accordance with the predetermined transaction profile of the information system. At the same time, status data of the information system is collected 1704, in the form of Raw Elements and in accordance with the collection schedule maintained by the job scheduler. The performance indicators, including KPIs and KBIs, are computed 1706 from the collected status data, in accordance with the definitions stored within the knowledge tree. At the same time, either upon initial activation of the management system and/or under the control of, or upon the request of, an operator, the nominal system performance may be measured 1708 during a period of operation under normal conditions. As has been previously described, the nominal system performance provides a baseline for detecting degradation or other changes in transaction performance of the information system, and may also be used to provide normalised status data and performance indicators.

Given current values of status data and performance indicators established in steps 1704 and 1706, along with the nominal system performance measured in step 1708, the transaction performance of the system is compared 1710 with expected performance. In the event that a degradation in transaction performance is detected, an appropriate signal may be generated 1712 indicating the performance degradation. This signal may be internal to the management system, or may be manifested externally, for example by generation of an alarm 1714.

Furthermore, as has previously been described, in preferred embodiments of the invention the detection of any degradation in transaction performance results in activation 1716 of a Root Cause Analysis engine, which differentiates the current values of status data and performance indicators associated with the knowledge tree against the nominal system performance, in order to determine the rate of change of these values. In this way, the Root Cause Analysis engine is able to provide an indication to an operator of those status data values and/or performance indicators that have large or abnormal rates of change. In most instances, one or more of the identified status data values and performance indicators will identify the root cause of the performance degradation, and will thereby enable the operator to rapidly trace and correct the source of problems within the system under management.

It will be appreciated that the present invention is not limited in scope to the described embodiment, which is exemplary only. The scope of the invention will be understood to encompass variations, modifications and equivalents that would be apparent to persons of skill in the relevant field of technology. For example, protocols other than those described herein may be used to communicate with the managed objects of the information system under management. The knowledge base may be represented in forms other than that of a tree or similar hierarchical structure, and may be, for example, expressed as a table such as a spreadsheet. Alternative methods of reporting the status of the system to operators of the management system may be provided, including the sending of SMS messages, and the provision of different types of visual indicators on a status display. Various other modifications and variations known in the art will also be apparent.

The invention claimed is:

1. A method of managing a computing system, which comprises a plurality of managed resources, the method comprising the following computer-implemented steps of:

providing a knowledge base comprising a data structure embodying a system model, the data structures representing available status data of the managed resources and one or more system performance indicators;

generating transaction requests in accordance with a transaction profile of the system, said transaction requests being provided for processing by the system;

collecting the status data of the managed resources of the system in accordance with the system model stored in the knowledge base;

computing values of the system performance indicators based upon the collected status data;

detecting a degradation in performance of the system by comparing the computed value of at least one of the system performance indicators with a corresponding expected value; and in response to said detecting, generating a signal to indicate that a degradation in performance has occurred, to allow the status data and performance indicators to be analysed at the time at which said performance degradation occurs, wherein the system model defines the most appropriate status data to be collected from the managed resources in order to monitor the managed resources, without imposing any generic object model or set of abstractions upon the managed resources;

wherein the system model further defines each of the one or more system performance indicators as a function of the status data and/or other system performance indicators; and wherein the step of detecting a degradation in performance of the system comprises identifying a change in state of the evaluation of an arithmetic or Boolean expression associated with said at least one system performance indicator.

2. The method according to claim 1 wherein the step of collecting status data comprises collecting performance data relating to said managed resources.

3. The method according to either claim 1 wherein the step of generating transaction requests comprises generating requests to applications, shared services, communications services and/or access services.

4. The method according to claim 1 wherein the transaction profile is representative of actual operations performed by or on behalf of users of the computing system in accessing information services provided by the system, such that the performance of the system in response to the generated transaction requests reflects actual performance experienced by end users.

5. The method according to claim 1 wherein the step of generating transaction requests comprises generating said requests from user terminals of the computing system, such that the monitored transaction performance of the system comprises the performance of resources that are local to the user terminals.

6. The method according to claim 1 wherein the expected value of said at least one system performance indicator is determined by measuring the transaction performance of the system for a period of time under normal operating conditions.

7. The method according to claim 1 wherein the knowledge base is hierarchically structured, wherein the status data is represented at a lowest level of the hierarchy, and derived system performance indicators are represented at higher levels so as to provide an increasing degree of abstraction.

8. The method according to claim 1 wherein the step of collecting status data comprises obtaining the status data from the managed resources of the system using one or more protocols selected from the following group: Simple Network Management Protocol (SNMP); File Transfer Protocol (FTP); Open Database Connectivity (ODBC); Remote Procedure Call (RPC): Remote Shell (RSH); Secure Shell (SSH); Telnet; CSV.

9. The method according to claim 1 wherein the step of collecting status data comprises repeatedly collecting status data at predetermined and substantially regular intervals, such that each item of status data has an associated resolution period that is equal to the corresponding collection interval.

10. The method according to claim 1 wherein each said system performance indicator has an associated resolution period that is appropriate to the nature of the system performance indicator, and wherein the step of computing values of the system performance indicators comprises calculating values of each system performance indicator at predetermined substantially regular intervals corresponding with said resolution period.

11. The method according to claim 10 wherein, in the event that a system performance indicator resolution period is equal to or greater than a multiple of one or more status data resolution periods upon which it depends, the system performance indicator is calculated using a minimum, maximum or average of the corresponding status data values.

12. The method according to claim 1 further comprising the computer-implemented step of performing an initial baseline measurement of status data values and system performance indicators in order to determine nominal values data and system performance indicators corresponding with an expected performance of the system.

13. The method according to claim 12 wherein the step of computing values of the system performance indicators of the system comprises computing normalised values of status data and system performance indicators, said normalised values being values of said status data and system performance indicators relative to the nominal values determined by the baseline measurement.

14. The method according to claim 1 wherein the step of generating a signal to indicate that a degradation in performance has occurred comprises generating an alarm or alert to an operator of the computing system.

15. The method according to claim 1 wherein an action is initiated comprising conducting a Root Cause Analysis in order to identify a cause of the detected degradation in system performance.

16. The method according to claim 15 wherein the Root Cause Analysis comprises differentiating the knowledge base against a baseline measurement corresponding with the expected performance of the system, in order to determine a rat of change of the normalised status data values and system performance indicators such that status data values and/or system performance indicators that have large or otherwise abnormal rates of change are identified.

17. The method according to claim 1 further comprising the computer-implemented step of monitoring the system to determine whether it is operating within a safe operating area, and generating a signal to indicate that a degradation in performance has occurred only when operation of the system is within said safe operating area.

18. An apparatus for managing a computer system which comprises a plurality of managed resources, the apparatus comprising:

a knowledge base comprising a data structure embodying a system model, the data structures representing available status data of the managed resources and one or more system performance indicators;

a processing unit;

computer readable storage media have computer readable instructions stored thereon, which when executed by the processing unit, cause the apparatus to generate transaction requests in accordance with a transaction profile of the system, said transaction request being provided for processing by the system;

collect the status data of the managed resources of the system in accordance with the system model;

compute values of the system performance indicators based upon the collected status data;

detect a degradation in performance of the system by comparing the computed value of at least one of the system performance indicators with a corresponding expected value; and generate a signal to indicate that a degradation in performance has occurred, when a degradation in performance is detected, wherein the system model defines the most appropriate status data to be collected from the managed resources in order to monitor the managed resources, without imposing any generic object model or set of abstractions upon the managed resources;

wherein the system model further defines each of the one or more system performance indicators as a function of the status data and/or other system performance indicators; and wherein causing the apparatus to detect the degradation in performance of the system comprises identifying a change in state of the evaluation of an arithmetic or Boolean expression associated with said at least one system performance indicator.

19. The apparatus for managing a computer system according to claim 18 wherein causing the apparatus to generate transaction requests includes executing one or more communication protocols for generating requests to applications, shared services, communications services and/or access services.

20. The apparatus for managing a computer system according to claim 19 wherein said protocols are selected from the group of Internet protocols including of: TCP; UDP; HTTP; FTP; SMTP; DNS; ARP.

21. The apparatus for managing a computer system according to either claim 19 wherein causing the apparatus to generate transaction requests includes executing remote procedure calls to direct managed elements within the system to generate transaction requests.

22. The apparatus for managing a computer system according to claim 18 wherein causing the apparatus to detect a degradation in performance comprises measuring the time taken by the system to process transaction requests, and comparing the measured time with expected times held within a memory store.

23. The apparatus for managing a computer system according to claim 22 wherein said expected times are obtained from measurements of transaction performance of the system conducted over a period of time under normal operating conditions of the system, the results of said measurements being stored within the memory store for later comparison with the results of subsequent measurements of transaction performance.

24. The apparatus for managing a computer system according to claim 18 wherein causing the apparatus to collect status data includes executing one or more communications protocols for communicating with managed resources of the system to retrieve status data therefrom.

25. The apparatus for managing a computer system according to claim 24 wherein the protocols which collect status data executes are selected from the group consisting of: SNMP; FTP; ODBC; RPC; RSH; SSH; Telnet; CSV.

26. The apparatus for managing a computer system according to claim 18 further comprising a scheduler component executable by the processing unit and stored on the computer readable storage media for scheduling the collection of status data at predetermined substantially regular intervals.

27. The apparatus for managing a computer system according to claim 18 wherein causing the apparatus to compute values of the system performance indicators includes executing one or more periodic tasks that recompute each of the performance indicators in accordance with an associated resolution period, and store the computed values within a memory store.

28. The apparatus for managing a computer system according to claim 18 wherein the computer readable storage media has further computer readable instructions stored therein, which when executed by the processing unit, cause the apparatus to perform at least one action when a degradation in system performance has been detected.

29. The apparatus for managing a computer system according to claim 28 further including a Root Cause Analysis component executable by the processing unit and stored on the computer readable storage media, and wherein said at least one action comprising executing the Root Cause Analysis to perform an analysis to identify a cause of the detected degradation in system performance.

30. The apparatus for managing a computer system according to claim 29 wherein the Root Cause Analysis component when executed by the processing unit differentiates collected status data and/or determined performance indicators against stored baseline measurements representing a nominal performance of the system, in order to identify status data and/or performance indicators that have large or abnormal rates of change.

31. The apparatus for managing a computer system according to claim 18 wherein the knowledge base is hierarchically structured such that status data is represented at a lowest level of the hierarchy, and derived performance indicators are represented at higher levels, and with an increasing degree of abstraction.

32. A computer readable storage medium comprising computer executable instructions which, when executed on a computer, implement a method according to claim 1.

* * * * *

UNITED STATES PATENT AND TRADEMARK OFFICE
CERTIFICATE OF CORRECTION

| | | |
|---|---|---|
| PATENT NO. | : 7,953,847 B2 | |
| APPLICATION NO. | : 11/706031 | |
| DATED | : May 31, 2011 | |
| INVENTOR(S) | : Roland Grelewicz et al. | |

It is certified that error appears in the above-identified patent and that said Letters Patent is hereby corrected as shown below:

Title page, Item (63), related US Application Data section:
Please insert --Continuation of PCT/AU2005/001207, filed on August 11, 2005--

Title page, Item (30), Foreign Application Priority Data section:
Please insert --August 13, 2004 (AU) ...................... 2004904606--

Column 22, Claim 12, Line 18
Please delete "values data" and insert --values of the status data--

Column 22, Claim 16, Line 40
Please delete "rat" and insert --rate--

Column 23, Claim 20, Line 31
Please delete "including" and insert --consisting--

Column 23, Claim 21, Line 34
Please delete "either"

Column 24, Claim 29, Line 28
Please delete "including" and insert --comprising--

Column 24, Claim 29, Line 31
Please delete "comprising" and insert --comprises--

Signed and Sealed this
Seventeenth Day of January, 2012

David J. Kappos
*Director of the United States Patent and Trademark Office*